United States Patent
Thode

(10) Patent No.: US 11,914,394 B2
(45) Date of Patent: Feb. 27, 2024

(54) MATERIALS HANDLING VEHICLE PATH VALIDATION AND DYNAMIC PATH MODIFICATION

(71) Applicant: Crown Equipment Corporation, New Bremen, OH (US)

(72) Inventor: Justin F. Thode, Auckland (NZ)

(73) Assignee: Crown Equipment Corporation, New Bremen, OH (US)

( * ) Notice: Subject to any disclaimer, the term of this patent is extended or adjusted under 35 U.S.C. 154(b) by 97 days.

(21) Appl. No.: 17/680,712

(22) Filed: Feb. 25, 2022

(65) Prior Publication Data

US 2022/0253071 A1 Aug. 11, 2022

Related U.S. Application Data

(60) Continuation of application No. 16/991,140, filed on Aug. 12, 2020, now Pat. No. 11,294,393, which is a
(Continued)

(51) Int. Cl.
*G05D 1/02* (2020.01)
*B66F 17/00* (2006.01)
(Continued)

(52) U.S. Cl.
CPC ......... *G05D 1/0274* (2013.01); *B60W 30/095* (2013.01); *B60W 40/105* (2013.01);
(Continued)

(58) Field of Classification Search
CPC .... B66F 17/003; B66F 9/075; B60Y 2200/15; B60Y 2200/148; B60Y 2200/221; B60Y 2300/095; B60Y 2520/10; B60Y 2556/50
See application file for complete search history.

(56) References Cited

U.S. PATENT DOCUMENTS

| 4,005,838 A | 2/1977 | Grundy |
| 4,660,895 A | 4/1987 | Chlumecky et al. |

(Continued)

FOREIGN PATENT DOCUMENTS

| CN | 2328020 Y | 7/1999 |
| CN | 105261236 A | 1/2016 |

(Continued)

OTHER PUBLICATIONS

Notice of Preliminary Rejection pertaining to Korean Application No. 10-2019-7008614.
(Continued)

*Primary Examiner* — Jeffrey C Boomer
(74) *Attorney, Agent, or Firm* — Dinsmore & Shohl LLP

(57) ABSTRACT

A materials handling vehicle comprising a path validation tool and a drive unit, steering unit, localization module, and navigation module that cooperate to navigate the vehicle along a warehouse travel path. The tool comprises warehouse layout data, a proposed travel path, vehicle kinematics, and a dynamic vehicle boundary that approximates the vehicle physical periphery. The tool executes path validation logic to determine vehicle pose along the proposed travel path, update the dynamic vehicle boundary to account for changes in vehicle speed and steering angle, determine whether the dynamic vehicle boundary is likely to intersect obstacles represented in the layout data based on the determined vehicle pose at candidate positions along the proposed travel path, determine a degree of potential impingement at the candidate positions by referring to the dynamic vehicle boundary and obstacle data, and modify the proposed travel path to mitigate the degree of potential impingement.

20 Claims, 16 Drawing Sheets

Related U.S. Application Data division of application No. 15/686,899, filed on Aug. 25, 2017, now Pat. No. 10,775,805.

(60) Provisional application No. 62/380,060, filed on Aug. 26, 2016, provisional application No. 62/380,089, filed on Aug. 26, 2016.

(51) Int. Cl.
*B66F 9/075* (2006.01)
*G05D 1/00* (2006.01)
*B60W 30/095* (2012.01)
*B60W 40/105* (2012.01)
*B62D 53/00* (2006.01)

(52) U.S. Cl.
CPC ............ *B62D 53/005* (2013.01); *B66F 9/075* (2013.01); *B66F 17/003* (2013.01); *B60W 2300/152* (2013.01); *B60W 2520/10* (2013.01); *B60W 2540/18* (2013.01); *B60W 2556/50* (2020.02); *G05D 2201/0216* (2013.01)

(56) References Cited

U.S. PATENT DOCUMENTS

| | | |
|---|---|---|
| 4,755,089 A | 7/1988 | Ellgass |
| 4,811,228 A | 3/1989 | Hyyppa |
| 4,846,297 A | 7/1989 | Field et al. |
| 5,111,401 A | 5/1992 | Everett, Jr. et al. |
| 5,295,551 A | 3/1994 | Sukonick |
| 5,524,548 A | 6/1996 | Fox |
| 5,612,883 A | 3/1997 | Shaffer et al. |
| 5,667,592 A | 9/1997 | Boitnott et al. |
| 5,764,014 A | 6/1998 | Jakeway et al. |
| 5,970,433 A | 10/1999 | Oka et al. |
| 6,393,362 B1 | 5/2002 | Burns |
| 6,784,800 B2 | 8/2004 | Orzechowski |
| 6,799,100 B2 | 9/2004 | Burns et al. |
| 7,073,753 B2 | 7/2006 | Root et al. |
| 7,206,686 B2 | 4/2007 | Sawamoto et al. |
| 7,266,453 B2 | 9/2007 | Sawamoto et al. |
| 7,742,853 B2 | 6/2010 | Mori et al. |
| 7,809,506 B2 | 10/2010 | Kuge et al. |
| 7,826,970 B2 | 11/2010 | Kobayashi et al. |
| 7,925,409 B2 | 4/2011 | Fry et al. |
| 8,050,863 B2 | 11/2011 | Trepagnier et al. |
| 8,180,514 B2 | 5/2012 | Kaprielian et al. |
| 8,210,791 B2 | 7/2012 | Chilson et al. |
| 8,427,472 B2 | 4/2013 | Moravec |
| 8,485,301 B2 | 7/2013 | Grubaugh et al. |
| 8,536,610 B2 | 9/2013 | Doany et al. |
| 8,688,275 B1 | 4/2014 | Lafary et al. |
| 8,725,294 B2 | 5/2014 | Gienger |
| 8,755,035 B2 | 6/2014 | Mizuno et al. |
| 8,965,579 B2 | 2/2015 | Lai et al. |
| 8,965,677 B2 | 2/2015 | Breed et al. |
| 9,168,656 B1 | 10/2015 | Lai et al. |
| 9,310,608 B2 * | 4/2016 | Weiss ................... G02B 26/105 |
| 9,336,684 B2 | 5/2016 | Harasaki |
| 9,410,811 B2 | 8/2016 | Pfaff et al. |
| 2005/0021195 A1 | 1/2005 | Zeitler et al. |
| 2010/0235033 A1 | 9/2010 | Yamamoto et al. |
| 2010/0241289 A1 | 9/2010 | Sandberg |
| 2014/0114526 A1* | 4/2014 | Erb ....................... B66F 17/003 |
| | | 701/28 |
| 2014/0210646 A1 | 7/2014 | Subramanya |
| 2014/0278029 A1 | 9/2014 | Tonguz et al. |
| 2014/0297135 A1 | 10/2014 | Larsson |
| 2015/0145661 A1 | 5/2015 | Beggs et al. |
| 2015/0221222 A1 | 8/2015 | Hamada et al. |
| 2016/0098648 A1 | 4/2016 | Katsuki et al. |
| 2016/0189443 A1 | 6/2016 | Smith |
| 2017/0017236 A1 | 1/2017 | Song et al. |
| 2017/0017239 A1 | 1/2017 | Kanai et al. |
| 2017/0049288 A1 | 2/2017 | Knutson et al. |
| 2017/0082751 A1 | 3/2017 | Maisonnier et al. |
| 2017/0236422 A1 | 8/2017 | Naka et al. |
| 2019/0271990 A1 | 9/2019 | Grabbe et al. |
| 2021/0261331 A1 | 8/2021 | Otto et al. |

FOREIGN PATENT DOCUMENTS

| | | |
|---|---|---|
| DE | 102012008846 A1 | 11/2012 |
| DE | 102012006738 A1 | 10/2013 |
| EP | 2848502 A2 | 3/2015 |
| EP | 2952928 A1 | 12/2015 |
| JP | 2506133 B2 | 6/1996 |
| JP | 2006259877 A * | 9/2006 |
| WO | 2016051817 A1 | 4/2016 |
| WO | 2016102130 A1 | 6/2016 |
| WO | 2016051818 A1 | 7/2016 |

OTHER PUBLICATIONS

Search Report pertaining to European Application No. 20163778.2 dated Jul. 30, 2020.
Translation of JP-2006259877-A (Year: 2006).
Communication pursuant to Rule 164{2}{b} and Article 94{E} EPC from Europeon Patent Office relating to European \Application No. 17 765 299.7-1202 dated Jun. 15, 2020.
International Search Report and Written Opinion pertaining to PCT/US2017/048669 dated Jan. 23, 2018.
Benmounah et al., "Obstacle Detection and Decision Making for Intelligent Mobile Robot", p. 537-538.
Bouguerra et al., "An Autonmous Robotic System for Load Transportation", Orebro University and Halmstad University, p. 1-4.
Lengerke et al., "Trajectories and Simulation Model of AGVs with Trailers", ABCM Symposium Series in Mchatronics, 2010, vol. 4, p. 509-518.
Mehrdadi et al., "Design of a Navigation System for Automated Guided Vehicles Operating in a Man-Machine Shared Environment", Transactions on Engineering Sciences, 1997, vol. 16, WIT Press.
Shaikh et al., "AGV Path Planning and Obstacle Avoidance Using Dijkstra's Algorithm", International Journal of Application or Innovation in Engineering & Management {IJAIEM), 2013, 2: 6, p. 77-83.
Ahja et al., "Framed-Quadtree Path Planning for Mobile Robots Operating in Sparse Environments", IEEE :; Conference on Robotics and Automation {ICRA), Levuen, Belgium, May 1998.
Egemin Automation, AGV Safety Spec Sheet, 2015.
E'gv, Egemin Guided Vehicles Delivered with Excellent Catalog.
Huang et al., "An Intent Inference Based Dynamic Obstacle Avoidance Method of Intelligent Vehicle in Structured Environment", Dec. 6-9, 2015, Robotics and Biomimetics {ROBIO), 2015 IEEE International Conference, DOI: 10.1109/ROBI0.2015.7418977.
University of Alicante {Universitat d'Alacant), "Autonomous Vehicles for Transport of Materials in Warehouse", p. 1-5.
Invitation to Pay Additional Fees pertaining to PCT/US2017/048669 dated Nov. 30, 2017.
ASTI helps to optimise material handling operations for Aciturri, Mining, Pack Stack Rack and Roll, Power and Fuel, RFID and IT, Safety at Work, Oct. 11, 2011, MHWmagazine.
Cisco-Eagle, "Preventing a Forklift Collision", 2017.
AutoGuide Mobile Robots, "Man-Aboard Tugger AGVs", Catalog/Spec Sheet, 2017.
Daifuku, "SmartCart-Automatic Guided Cart Installed Systems", Catalog/Spec Sheet, 2015.

* cited by examiner

MATERIALS HANDLING VEHICLE PATH VALIDATION AND DYNAMIC PATH MODIFICATION

CROSS-REFERENCE TO RELATED APPLICATIONS

This application is a continuation of U.S. patent application Ser. No. 16/991,140, filed Aug. 12, 2020, which is a divisional of U.S. patent application Ser. No. 15/686,899, filed Aug. 25, 2017, which claims the benefit of U.S. Provisional Application Ser. Nos. 62/380,060 and 62/380,089, each filed Aug. 26, 2016, the entireties of which are incorporated by reference herein.

BACKGROUND

The present disclosure relates to tools for verifying the path of a materials handling vehicle, and more particularly, to path validation tools for verifying the path of a materials handling vehicle in a warehouse. For the purposes of defining and describing the concepts and scope of the present disclosure, it is noted that a "warehouse" encompasses any indoor or otherwise covered facility in which materials handling vehicles transport goods including, but not limited to, warehouses intended primarily for the storage of goods, such as those where multi-level warehouse racks are arranged in aisles, and manufacturing facilities where goods are transported about the facility by materials handling vehicles for use in one or more manufacturing processes.

BRIEF SUMMARY

According to the subject matter of the present disclosure, a materials handling vehicle comprising a vehicle body, materials handling hardware, one or more wheels, a drive unit, a steering unit, a localization module, a navigation module, and a path validation tool. The drive unit, steering unit, localization module, and navigation module cooperate to direct the materials handling vehicle along a travel path in a warehouse. The path validation tool comprises environmental layout data of the warehouse, a proposed travel path within the warehouse, kinematics of the materials handling vehicle, and a dynamic vehicle boundary of the materials handling vehicle. The dynamic vehicle boundary of the materials handling vehicle approximates the physical periphery of the materials handling vehicle. The path validation tool executes path validation logic to (i) determine vehicle pose along the proposed travel path, (ii) update the dynamic vehicle boundary to account for changes in vehicle speed and steering angle, (iii) determine whether the dynamic vehicle boundary of the vehicle is likely to intersect obstacles represented in the environmental layout data based on the determined vehicle pose at candidate positions along the proposed travel path, (iv) determine a degree of potential impingement at the candidate positions by referring to the dynamic vehicle boundary of the materials handling vehicle and obstacle data represented in the environmental layout data, and (v) modify the proposed travel path to mitigate the degree of potential impingement. The drive unit, steering unit, localization module, and navigation module cooperate to direct the materials handling vehicle along the modified proposed travel path.

In embodiments, the dynamic vehicle boundary of the path validation tool comprises a dynamic exterior boundary of the materials handling vehicle and a dynamic clearance boundary of the materials handling vehicle, and the dynamic clearance boundary is enlarged relative to at least a portion of the dynamic exterior boundary of the materials handling vehicle to define an enlarged boundary about at least a portion of the materials handling vehicle. The path validation tool may execute path validation logic to (i) determine whether the dynamic clearance boundary of the materials handling vehicle is likely to intersect obstacles represented in the environmental layout data based on the determined vehicle pose at candidate positions along the proposed travel path, (ii) correlate likely points of intersection along the proposed travel path with vehicle pose at the candidate positions along the proposed travel path to build a list of potentially intersecting candidates along the proposed travel path, and (iii) determine the degree of potential impingement at the candidate positions by referring to the list of potentially intersecting candidates, the dynamic exterior boundary of the materials handling vehicle, and obstacle data represented in the environmental layout data. The path validation tool may execute path logic to determine vehicle pose along one of the proposed travel paths and the modified proposed travel path at pre-determined intervals. The kinematics of the materials handling vehicle may comprise at least a kinematic center C of the materials handling vehicle, data on the materials handling vehicle to include exterior dimensions, a turning radius, and pose data.

The materials handling vehicle may comprise a tugger and one or more trailers coupled to the tugger, and the pose data is indicative of pose data respectively of the tugger and the one or more trailers. The materials handling vehicle may comprise a tugger and one or more trailers coupled to the tugger, the dynamic vehicle boundary approximates a physical periphery of the tugger of the materials handling vehicle, and a potentially intersecting obstacle is a trailer of the one or more trailers coupled to the tugger. The materials handling vehicle may comprise a tugger and one or more trailers coupled to the tugger, the dynamic vehicle boundary approximates a physical periphery of a trailer of the one or more trailers of the materials handling vehicle, and a potentially intersecting obstacle is another trailer of the one or more trailers coupled to the trailer. The materials handling vehicle may comprise a tugger and one or more trailers coupled to the tugger, the dynamic vehicle boundary approximates a physical periphery of one of the tugger and the one or more trailers of the materials handling vehicle, and a potentially intersecting obstacle is an obstacle represented in the environmental layout data separate from the materials handling vehicle.

In further embodiments, the path validation tool executes path validation logic to (i) determine vehicle pose along the modified proposed travel path as the drive unit, steering unit, localization module, and navigation module cooperate to direct the materials handling vehicle along the modified proposed travel path, (ii) determine whether the dynamic vehicle boundary of the materials handling vehicle is likely to intersect obstacles represented in the environmental layout data based on the determined vehicle pose at candidate positions along the modified proposed travel path, (iii) determine a degree of potential impingement at the candidate positions by referring to the dynamic vehicle boundary of the materials handling vehicle and obstacle data represented in the environmental layout data, (iv) dynamically modify the modified proposed travel path to mitigate the degree of potential impingement and establish a dynamically modified travel path configured to merge from and to the modified proposed travel path, and (v) navigate the materials handling vehicle along the dynamically modified travel path. Establishment of the dynamically modified travel path configured to merge from and to the modified proposed travel path may comprise fitting a joining path to the modified proposed travel path, the joining path comprising a series of three clothoids and merge path lengths, the merge path lengths configured to be varied until a close fit comprising a lowest join error is determined. Optimization towards the lowest join error may comprise an initial proposed merge path comprising a 1:1:1 length ratio with respect to the ratios of clothoid lengths, the total length of the initial proposed merge path, and a curvature at an end of a first clothoid. The total length of the proposed merge path may comprise a Euclidean distance between a pair of join points. Curvature options with respect to the curvature may comprise an even spread between a maximum allowed positive curvature and a maximum negative path curvature, the even spread based on one or more steer angle limits.

In embodiments, the path validation tool executes path validation logic to identify the degree of potential impingement at the candidate positions as one or more problem areas of at least one of the proposed travel path and a configuration of the materials handling vehicle with respect to the proposed travel path. A degree of potential impingement may comprise an impingement distance that is an overlap distance at candidate positions indicative of an overlap between the dynamic vehicle boundary of the materials handling vehicle and obstacle data.

In accordance with one embodiment of the present disclosure, a materials handling vehicle comprising a vehicle body, materials handling hardware, one or more wheels, a drive unit, a steering unit, a localization module, a navigation module, and a path validation tool, wherein the drive unit, steering unit, localization module, and navigation module cooperate to direct the materials handling vehicle along a travel path in a warehouse. The path validation tool comprises environmental layout data of the warehouse, a proposed travel path within the warehouse, kinematics of the materials handling vehicle, a dynamic exterior boundary of the materials handling vehicle, and a dynamic clearance boundary of the materials handling vehicle. The dynamic exterior boundary of the materials handling vehicle approximates the physical periphery of the materials handling vehicle. The dynamic clearance boundary is enlarged relative to at least a portion of the dynamic exterior boundary of the materials handling vehicle to define an enlarged boundary about at least a portion of the materials handling vehicle. The path validation tool executes path validation logic to (i) determine vehicle pose along the proposed travel path, (ii) determine whether the dynamic clearance boundary of the materials handling vehicle is likely to intersect obstacles represented in the environmental layout data based on the determined vehicle pose at candidate positions along the proposed travel path, (iii) correlate likely points of intersection along the proposed travel path with vehicle pose at the candidate positions along the proposed travel path to build a list of potentially intersecting candidates along the proposed travel path, (iv) determine a degree of potential impingement at the candidate positions by referring to the list of potentially intersecting candidates, the dynamic exterior boundary of the materials handling vehicle, and obstacle data represented in the environmental layout data, and (v) modify the proposed travel path to mitigate the degree of potential impingement. The drive unit, steering unit, localization module, and navigation module cooperate to direct the materials handling vehicle along the modified proposed travel path.

In embodiments, the path validation tool executes path validation logic to update the dynamic exterior boundary and the dynamic clearance boundary to account for changes in vehicle speed and steering angle. A degree of potential impingement may comprise an impingement distance that is an overlap distance between a potentially intersecting candidate and the dynamic exterior boundary. The materials handling vehicle may comprise a tugger and one or more trailers coupled to the tugger, and the potentially intersecting candidate is one of the tugger, a trailer, and an obstacle represented by obstacle data in the environmental layout data. The potentially intersecting candidate may be a trailer, and the overlap distance is defined between the trailer and the dynamic exterior boundary of the tugger of the materials handling vehicle. The potentially intersecting candidate may be a trailer, and the overlap distance is defined between the trailer and the dynamic exterior boundary of another trailer of the one or more trailers of the materials handling vehicle. The potentially intersecting candidate may be the obstacle, and the overlap distance is defined between the obstacle and the dynamic exterior boundary of the materials handling vehicle.

In accordance with another embodiment of the present disclosure is a method of executing path validation logic with respect to a materials handling vehicle comprising a vehicle body, materials handling hardware, one or more wheels, a drive unit, a steering unit, a localization module, a navigation module, and a path validation tool, the drive unit, steering unit, localization module, and navigation module cooperate to direct the materials handling vehicle along a travel path in a warehouse, the method comprising receiving a plurality of inputs into the path validation tool, the plurality of inputs comprising environmental layout data of the warehouse, a proposed travel path within the warehouse, kinematics of the materials handling vehicle, and a dynamic vehicle boundary of the materials handling vehicle that approximates the physical periphery of the materials handling vehicle. The method further comprises determining vehicle pose along the proposed travel path through the path validation tool, updating the dynamic vehicle boundary to account for changes in vehicle speed and steering angle through the path validation tool, determining whether the dynamic vehicle boundary of the vehicle is likely to intersect obstacles represented in the environmental layout data based on the determined vehicle pose at candidate positions along the proposed travel path through the path validation tool, determining a degree of potential impingement at the candidate positions by referring to the dynamic vehicle boundary of the materials handling vehicle and obstacle data represented in the environmental layout data through the path validation tool, modifying the proposed travel path to mitigate the degree of potential impingement through the path validation tool, and navigating the materials handling vehicle along the modified proposed travel path through cooperation of the drive unit, steering unit, localization module, and navigation module.

In accordance with yet another embodiment of the present disclosure is a method of executing path validation logic with respect to a materials handling vehicle comprising a vehicle body, materials handling hardware, one or more wheels, a drive unit, a steering unit, a localization module, a navigation module, and a path validation tool, the drive unit, steering unit, localization module, and navigation module cooperate to direct the materials handling vehicle along a travel path in a warehouse, the method comprising receiving a plurality of inputs into the path validation tool, the plurality of inputs comprising environmental layout data of the warehouse, a proposed travel path within the warehouse, kinematics of the materials handling vehicle, a dynamic exterior boundary of the materials handling vehicle, and a dynamic clearance boundary of the materials handling vehicle. The dynamic exterior boundary of the materials handling vehicle approximates the physical periphery of the materials handling vehicle. The dynamic clearance boundary is enlarged relative to at least a portion of the dynamic exterior boundary of the materials handling vehicle to define an enlarged boundary about at least a portion of the materials handling vehicle. The method further comprises determining vehicle pose along the proposed travel path through the path validation tool, determining whether the dynamic clearance boundary of the materials handling vehicle is likely to intersect obstacles represented in the environmental layout data based on the determined vehicle pose at candidate positions along the proposed travel path through the path validation tool, correlating likely points of intersection along the proposed travel path with vehicle pose at the candidate positions along the proposed travel path to build a list of potentially intersecting candidates along the proposed travel path through the path validation tool, determining a degree of potential impingement at the candidate positions by referring to the list of potentially intersecting candidates, the dynamic exterior boundary of the materials handling vehicle, and obstacle data represented in the environmental layout data through the path validation tool, modifying the proposed travel path to mitigate the degree of potential impingement through the path validation tool, and navigating the materials handling vehicle along the modified proposed travel path through cooperation of the drive unit, steering unit, localization module, and navigation module.

BRIEF DESCRIPTION OF THE DRAWINGS

The embodiments set forth in the drawings are illustrative and not intended to limit the subject matter defined by the claims. The following detailed description of the illustrative embodiments can be understood when read in conjunction with the following drawings, where like structure is indicated with like reference numerals and in which:

DETAILED DESCRIPTION

The following text sets forth a broad description of numerous different embodiments of the present disclosure. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, step or methodology described herein. It should be understood that multiple combinations of the embodiments described and shown are contemplated and that a particular focus on one embodiment does not preclude its inclusion in a combination of other described embodiments. Numerous alternative embodiments could also be implemented, using either current technology or technology developed after the filing date of this patent, which would still fall within the scope of the claims.

Figure 1:
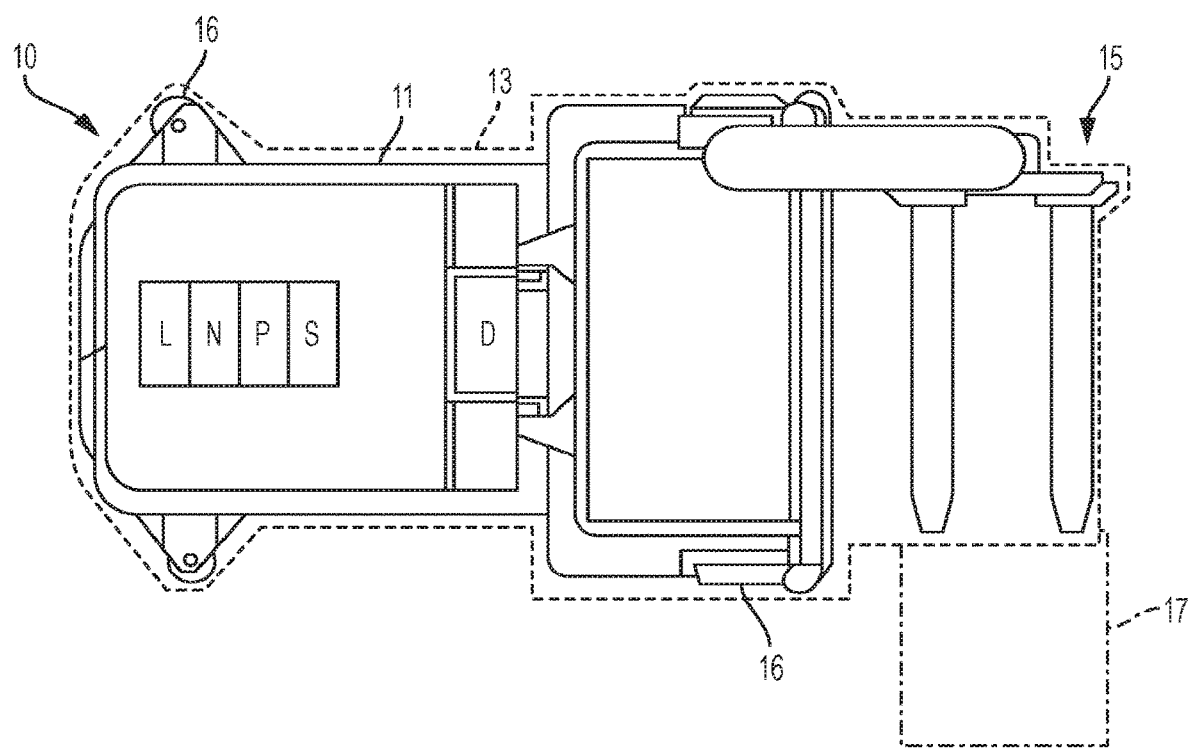
FIGS. 1, 1A, and 1B depict a top view of a materials handling vehicle according to one or more embodiments shown and described herein.
Figure 1A:
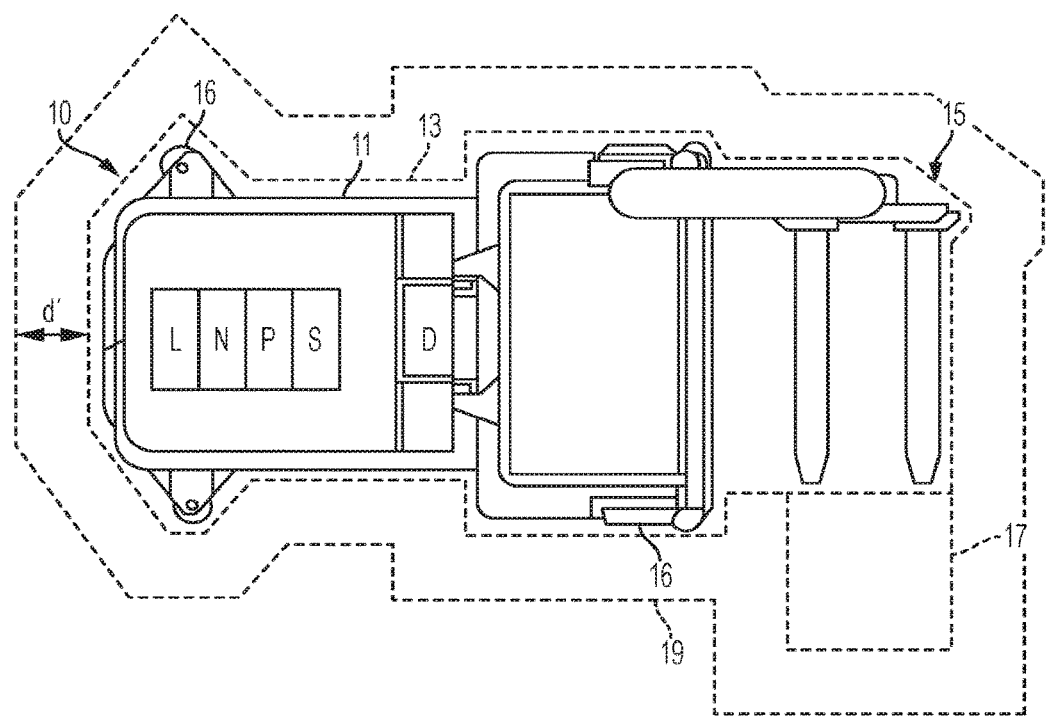
Figure 1B:
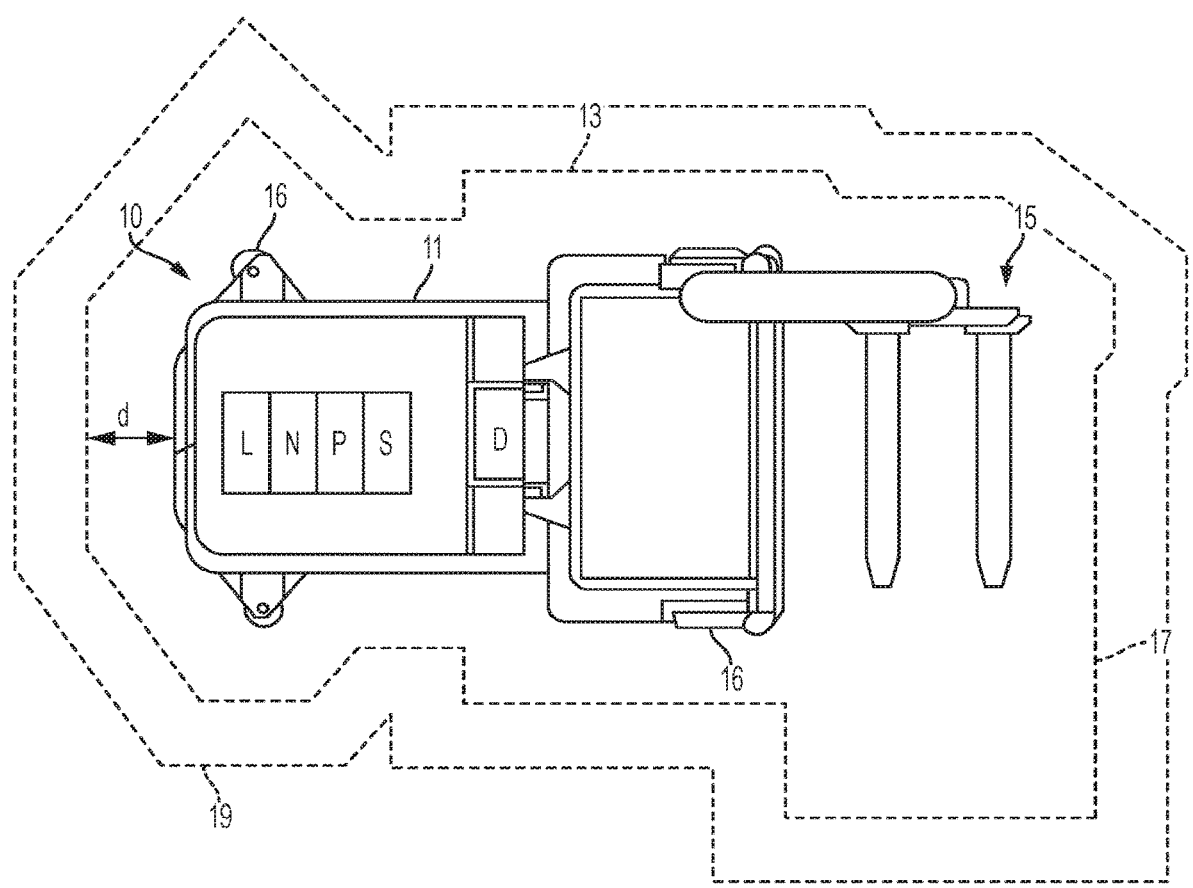
Figure 1C:
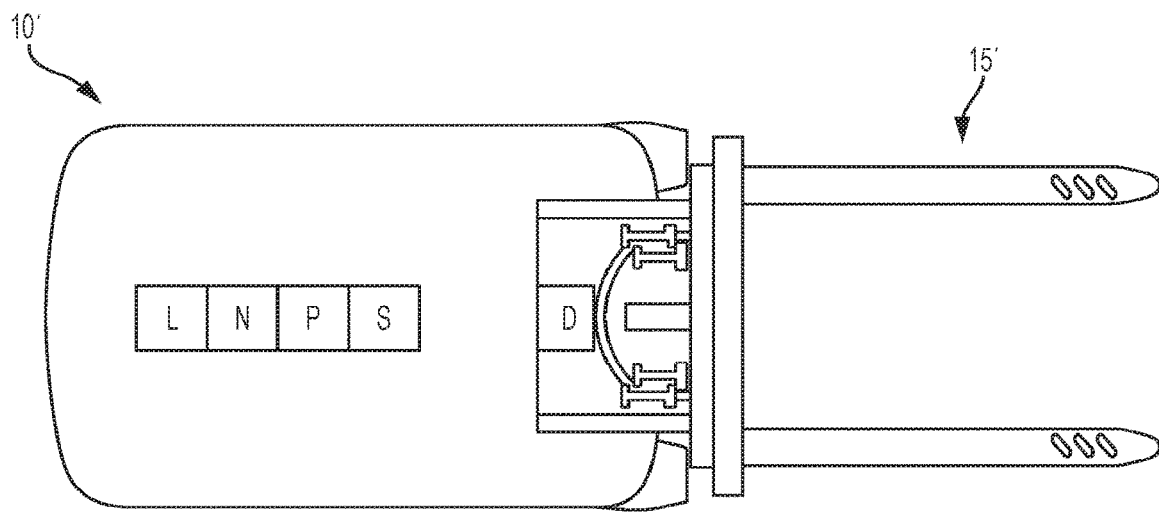
FIG. 1C depicts a top view of another materials handling vehicle according to one or more embodiments shown and described herein.
Figure 1D:
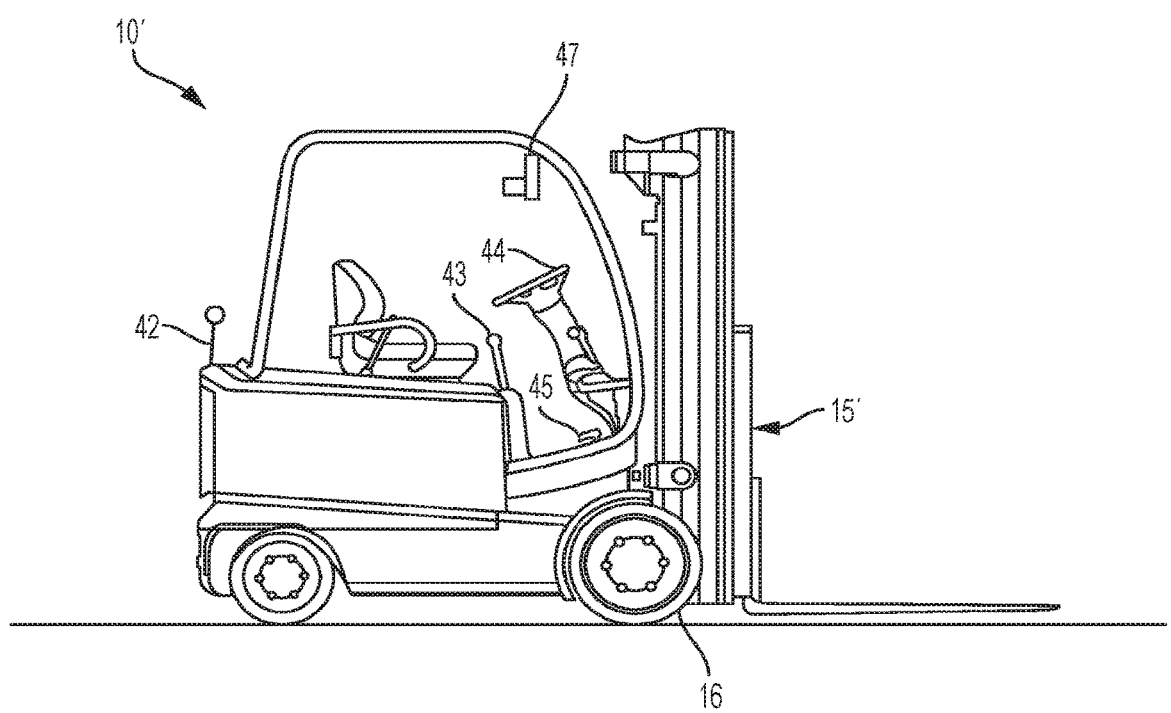
FIG. 1D depicts a side view of the materials handling vehicle of FIG. 1C.

Referring to FIGS. 1-1D, a materials handling vehicle 10, 10' is shown comprising a vehicle body 11, materials handling hardware 15, 15', one or more wheels 16, a drive unit D, a steering unit S, a localization module L, a navigation module N, and a path validation tool P. At least one wheel 16 may be part of the steering unit S. FIGS. 1C-1D illustrate a materials handling vehicle 10' in the form of a lift truck comprising conventional materials handling vehicle hardware, such as a steering unit S, a localization module L, a navigation module N, materials handling hardware 15', and a drive unit D, the details of which are beyond the scope of the present disclosure and may be gleaned from conventional and yet-to-be developed teachings in the materials handling vehicle literature — examples of which include U.S. Pat. Nos. 6,135,694, RE37215, 7,017,689, 7,681,963, 8,131,422, and 8,718,860, each of which is assigned to Crown Equipment Corporation.

Referring to FIG. 1D, the materials handling vehicle 10' may include one or more user interfaces that permit an operator to interface with the control functions of the materials handling vehicle. For example, and not by way of limitation, suitable user interfaces include, but are not limited to, conventional or yet-to-be developed operator compartment control devices, such as a hand-operated control device 43 for controlling the materials handling hardware 15', a foot-operated vehicle speed control device 45 operatively coupled to the vehicle drive mechanism, a touch screen hardware control interface, which may be integral to, or separate from, an operator compartment display device 47, a steering control device 44 operatively coupled to the steered wheels of the materials handling vehicle 10, or combinations thereof. The materials handling hardware 15' may be any type of conventional or yet-to-be developed hardware equipped to handle materials, is typically configured to facilitate the storage and retrieval of goods, and may include, but is not limited to, a set of fork tines, a container handler, a turret with forks, a pantrograph, a telescopic handler, and the like.

In one embodiment, the user interface may comprise an antenna 42 or other type of automated interface with an external or remote control device, which may be used to issue commands to the materials handling vehicle 10' or otherwise remotely control the materials handling vehicle 10'. The antenna 42 can be configured to wirelessly communicatively couple the materials handling vehicle 10' to a remote computer. Alternatively, or additionally, other types of automated interfaces may be provided, such as, for example, input/output ports, such as RS-232 connectors, USB ports, or the like. These types of interfaces may be provided to facilitate a hard wired connection between the materials handling vehicle 10' and a remote computer such as a laptop.

In the embodiment illustrated in FIG. 1, the materials handling hardware 15 comprises storage and retrieval hardware in the form of vertically displaceable and articulating forks, and one or more wheels 16, at least one of which is steerable and, as such, part of the steering unit. It is contemplated that, although the drive unit D, steering unit S, localization module L, navigation module N, and a path validation tool P are illustrated schematically as separate components of the materials handling vehicle, these components may be configured in a variety of ways, either as fully independent units, or as units that partially or fully share hardware and/or software.

Referring collectively to FIGS. 1, 1A, and 1B, the physical periphery of the materials handling vehicle 10 may be approximated by two different types of dynamic vehicle boundaries: a dynamic exterior boundary 13 and a dynamic clearance boundary 19. As is described in further detail herein, the dynamic exterior boundary 13 is a relatively close approximation of the physical periphery of the vehicle and may, for example, be represented by a simple or irregular polygon, by a shape consisting of a combination of curved and linear portions, or by a complex, non-geometric shape, each of which are designed to approximate the footprint of the vehicle. Although the dynamic exterior boundary 13 may be defined at any offset distance d from the physical periphery of the materials handling vehicle 10, it is contemplated that the offset will be relatively close to the body 11 of the vehicle 10, and, like the physical periphery, may vary from vehicle to vehicle depending upon a variety of factors. FIGS. 1A and 1B illustrate the dynamic clearance boundary 19, which is offset from the dynamic exterior boundary 13 of the vehicle by a distance d' that may be generally uniform, e.g., 0.5 m. Although the dynamic exterior boundary 13 and the dynamic clearance boundary 19 are illustrated in FIGS. 1, 1A, and 1B as being offset from the physical periphery of the vehicle 10 in a fairly uniform manner, it is contemplated that these boundaries may be offset from the physical periphery of the vehicle to different degrees, along different portions of the physical periphery. For example, it may be advantageous to incorporate a significantly larger boundary offset on a forward-facing side of the vehicle, as compared to a rearward-facing side of the vehicle. Regardless, the respective roles, and dynamic nature of, the dynamic exterior boundary 13 and the dynamic clearance boundary 19, are described in further detail below.

It is noted that many materials handling vehicles 10 will include hardware that articulates, or otherwise moves, to change the footprint of the vehicle. Referring to FIG. 1, examples of such hardware include, for example, vehicle forks or other storage and retrieval hardware 15 that can extend and/or rotate, operator compartment doors that open and close, robotic arms, etc. To account for this, as is illustrated in FIG. 1, the dynamic exterior boundary 13 may also include portions that approximate any articulation boundaries 17 of the vehicle.

Although the dynamic exterior boundary 13 is illustrated in FIG. 1 as a relatively complex shape consisting of a combination of curved and linear portions, it is contemplated that, in many cases, it will be advantageous to present the dynamic exterior boundary as an irregular polygon by eliminating the curved portions. By doing so, those practicing the concepts of the present disclosure will still have a more accurate representation of the peripheral outline of the vehicle, when compared to a simple rectangular boundary, but will enjoy a significantly reduced computational load, when compared to the complex shape of FIG. 1. FIG. 1A presents an example of a dynamic exterior boundary 13 in the form of an irregular polygon, without the use of the curved boundary portions of FIG. 1. FIG. 1B presents an example of an expanded dynamic exterior boundary 13 in the form of an irregular polygon, without the use of the curved boundary portions of FIG. 1.

Figure 2:
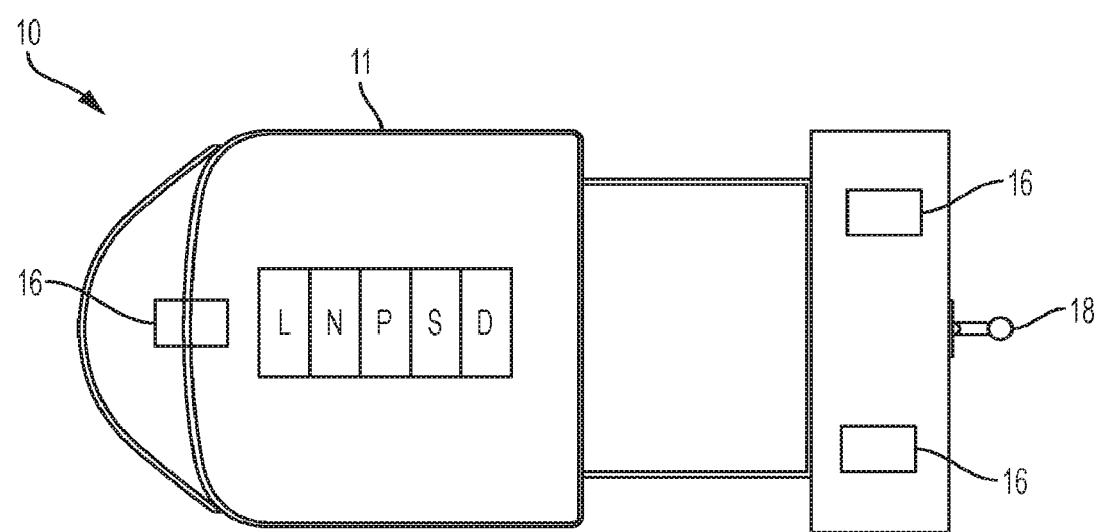
FIG. 2 depicts a top view of another embodiment of the materials handling vehicle according to one or more embodiments shown and described herein.

FIG. 2 depicts another embodiment of the materials handling vehicle 10 comprising the body 11, the aforementioned drive unit D, steering unit S, localization module L, navigation module N, and path validation tool P, one or more wheels 16, at least one of which is steerable and part of the steering unit, and a coupling device 18. In the embodiment illustrated in FIG. 2, materials handling hardware may be provided on the vehicle body 11 or may be provided as materials carrying surfaces or engagement hardware on one or more trailers connected via the coupling device 18, which may be a hitch, a hook, a pintle hook, lunette eye, a ball hitch, and like types of towing couplers. It should be understood that although embodiments of the materials handling vehicle 10, 10' are shown in FIGS. 1-2, any type of materials handling vehicle including, for example, forklifts, lift trucks, tractors, tugger-trailer trains, etc., including, but not limited to, those powered materials handling vehicles identified by the United States Department of Labor, Occupational Safety & Health Administration (OSHA) in Class I— Electric Motor Rider Trucks, Class II— Electric Motor Narrow Aisle Trucks, Class III— Electric Motor Hand Trucks or Hand/Rider Trucks, Class IV— Internal Combustion Engine Trucks (Solid/Cushion Tires), Class V— Internal Combustion Engine Trucks (Pneumatic Tires), Class VI— Electric and Internal Combustion Engine Tractors, and Class VII— Rough Terrain Forklift Trucks.

Figure 3:
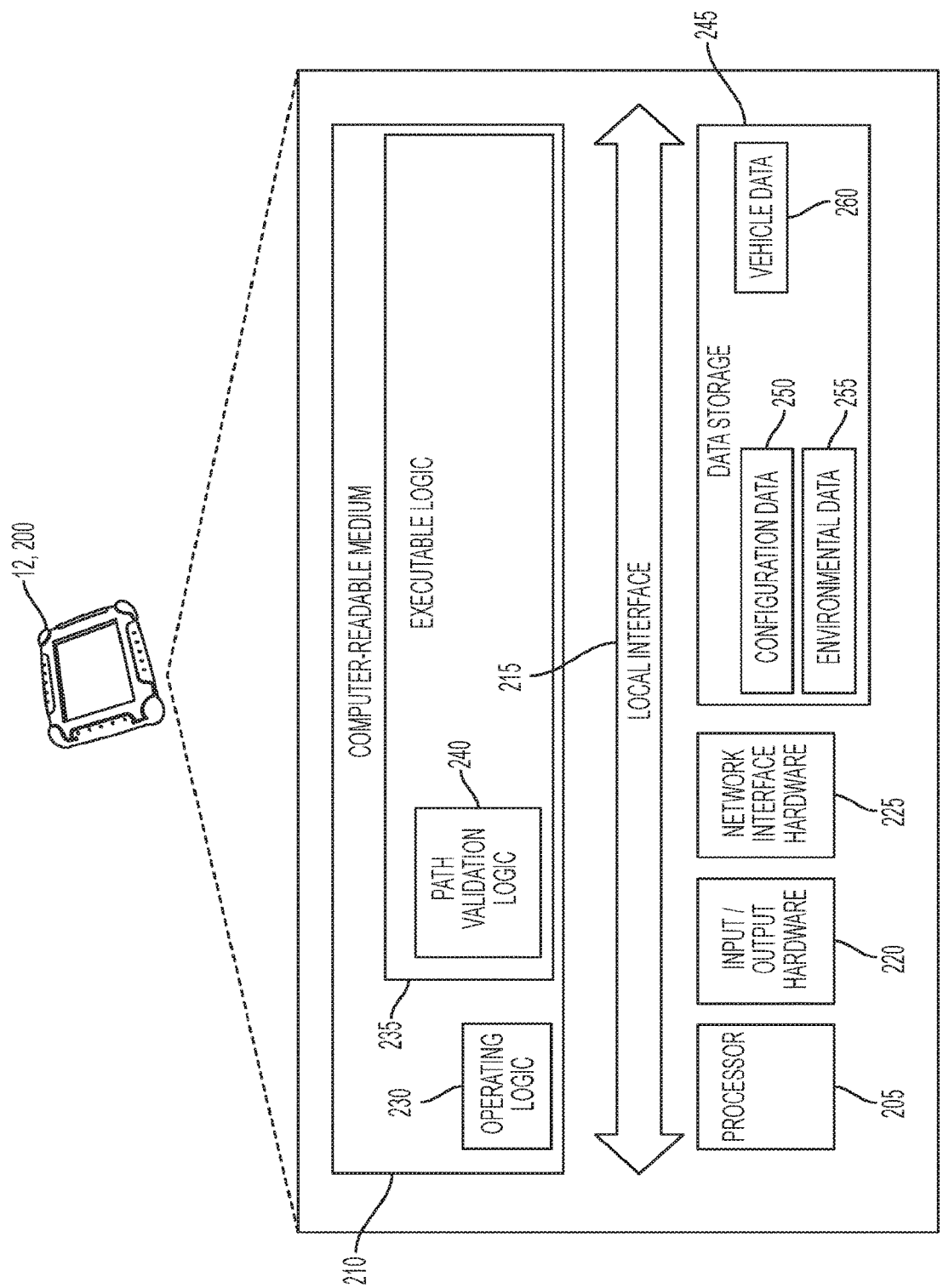
FIG. 3 depicts a computing environment according to one or more embodiments shown and described herein.

Note that FIG. 3 and the associated discussions provide a brief, general description of a suitable computing environment in which the present disclosure can be implemented. Although not required, aspects of the software are described in the general context of computer-executable instructions, such as routines executed by a general-purpose computer, e.g., stationary and mobile computers. Those skilled in the relevant art will appreciate that the software can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, server computers, and the like. Indeed, the terms "computer" and the like are generally used interchangeably herein, and refer to any of the above devices and systems, as well as any data processor. Aspects of the software can be embodied in a special purpose computer or data processor that is specifically programmed, configured, or constructed to perform one or more of the computer-executable instructions explained in detail herein. Aspects of the software can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Indeed, computer implemented instructions, data structures, screen displays, and other data under aspects of the software may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

The path validation tool P may be embodied in hardware and/or in software (including firmware, resident software, micro-code, etc.). In one embodiment, the path validation tool P is embodied in software and hardware. For example, referring to FIG. 3, the path validation tool P may comprise a program embodied in a computing device 200, which may comprise a vehicle controller including at least one processor 205, and a computer-readable medium 210 communicatively coupled through a local interface 215. Alternatively, suitable path validation tool software may be stored in a computer-useable or computer-readable medium 210 accessible by the vehicle controller (e.g., over a network). A computer-usable or the computer-readable medium 210 may be any non-transitory medium that can contain, store, communicate, propagate, or transport software for use by or in connection with the computing device 200.

The computer-usable or computer-readable medium 210 may be, for example but not limited to, an electronic, magnetic, optical, electromagnetic, infrared, or semiconductor system, apparatus, device, or propagation medium. More specific examples (a non-exhaustive list) of the computer-usable or computer-readable medium 210 would include the following volatile and non-volatile examples: an electrical connection having one or more wires, a computer diskette, a random access memory (RAM) (including SRAM, DRAM, and/or other types of RAM), a read-only memory (ROM), an erasable programmable read-only memory (EPROM or Flash memory), secure digital (SD) memory, registers, one or more optical fibers, a compact disc read-only memory (CD-ROM), and/or a digital video disc read-only memory (DVD-ROM). Note that the computer-usable or computer-readable medium 210 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In other words, non-transitory computer-usable or computer-readable medium 210 may include those computer-usable computer-readable mediums that are not signals per se. Depending on the particular embodiment, these non-transitory computer-usable computer-readable mediums may reside within the computing device 200 and/or external to the computing device 200.

Computer program code for carrying out the path validation tool of the present disclosure may be written in a high-level programming language, such as C or C++, for development convenience. In addition, computer program code for carrying out the path validation tool of the present disclosure may also be written in other programming languages, such as, but not limited to, interpreted languages. Some modules or routines may be written in assembly language or even micro-code to enhance performance and/or memory usage. However, software embodiments of the present disclosure do not depend on implementation with a particular programming language. It will be further appreciated that the functionality of any or all of the program modules may also be implemented using discrete hardware components, one or more application specific integrated circuits (ASICs), or a programmed digital signal processor, or microcontroller.

Additionally, the computer-usable or computer-readable medium 210 may be configured to store operating logic 230 and executable logic 235. The operating logic 230 may include an operating system, basic input output system (BIOS), and/or other hardware, software, and/or firmware for operating the computing device 200. The executable logic 235 comprises the path validation logic 240 which may each comprise a plurality of different pieces of logic, each of which may be embodied, as a non-limiting example, as a computer program, firmware, and/or hardware. The local interface 215 may comprise as a bus or other communication interface to facilitate communication among the components of the computing device 200.

The processor 205 may include any processing component operable to receive and execute instructions (such as from the data storage 245 and/or computer-readable medium 210). The input/output hardware 220 may include and/or be configured to interface with a monitor, positioning system, keyboard, mouse, printer, image capture device, microphone, speaker, sensors, gyroscope, compass, and/or other device for receiving, sending, and/or presenting data. The network interface hardware 225 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the computing device 200 and other computing devices. In one embodiment, the processor 205 may include and/or be coupled to a graphical processing unit (GPU).

The computing device 200 may comprise data storage 245. Data storage may be a subset of the computer-usable or computer-readable medium 210 or it may be a separate and distinct component within the computing device 200. The data storage 245 may comprise one or more data sets for use by the operating logic 230 and/or the executable logic 235. The data sets may comprise configuration data 250, environmental data 255, and vehicle data 260.

It should be understood that the components illustrated in FIG. 3 are merely exemplary and are not intended to limit the scope of this disclosure. As a non-limiting example, while the components in FIG. 3 are illustrated as residing within the computing device 200, this is merely an example and in some embodiments, one or more of the components may reside external to the computing device 200. It should also be understood that, while the computing device 200 is illustrated as a single device, this is also merely an example and in some embodiments, the path validation logic 240 may reside on different devices. Additionally, while the computing device 200 is illustrated with the path validation logic 240 as a single piece of logic, in some embodiments, the path validation logic 240 may comprise two or more separate logical components to perform the described functionality.

Figure 4:
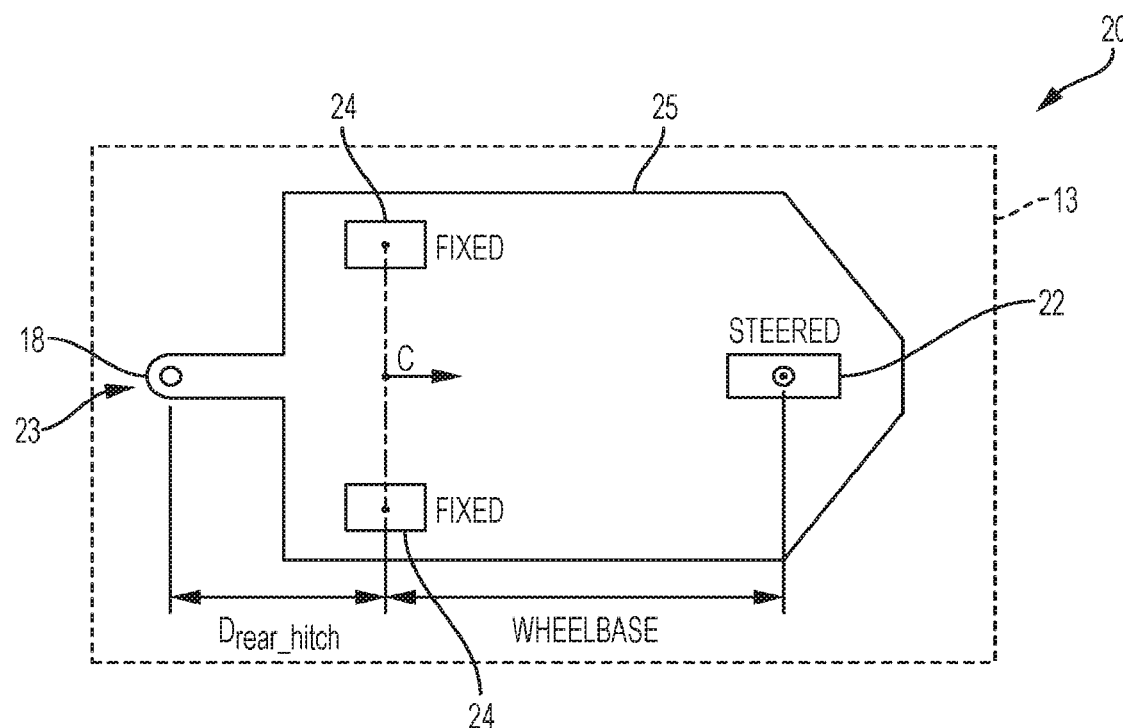
FIG. 4 depicts a tugger according to one or more embodiments shown and described herein.
Figure 5:
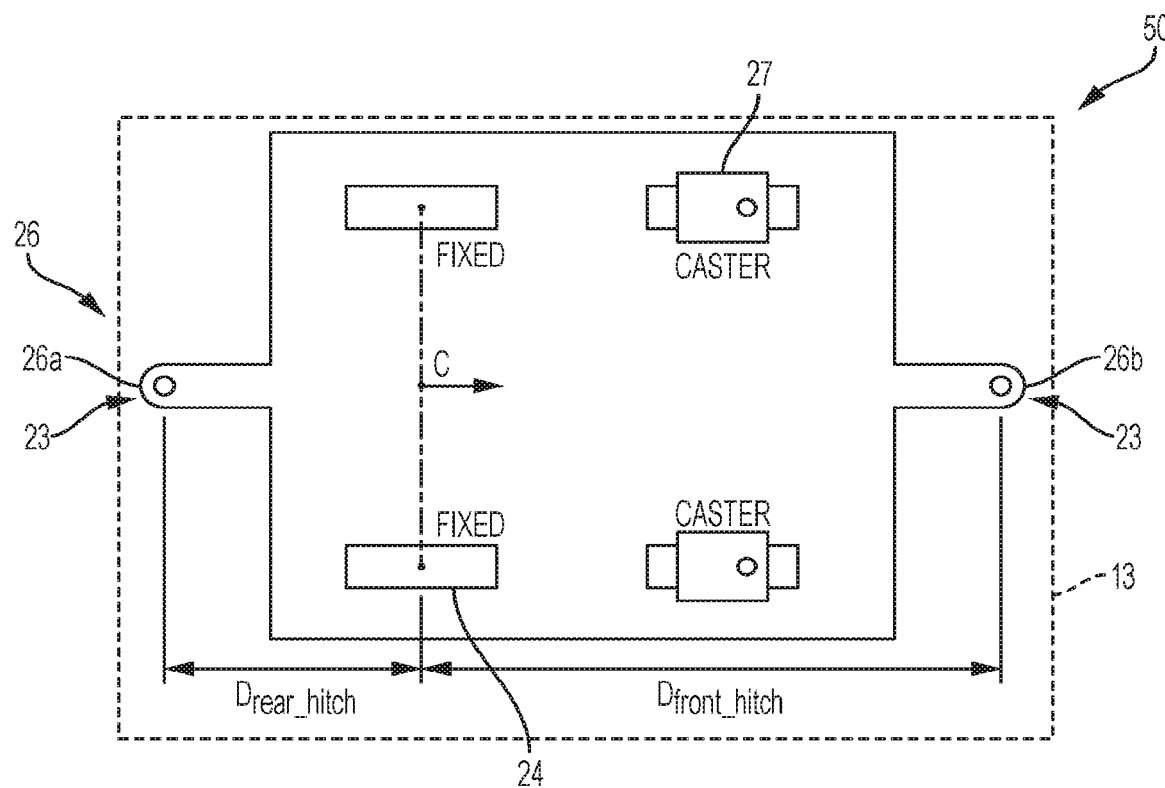
FIG. 5 depicts a trailer according to one or more embodiments shown and described herein.

FIG. 4 depicts a tugger 20 as one embodiment of a materials handling vehicle. The tugger 20 may comprise a tugger body 25, one or more steered wheels 22, one or more fixed wheels 24, and the coupling device 18. FIG. 4 also shows the dynamic exterior boundary 13 of the tugger 20. This dynamic exterior boundary 13 may be a simple polygon, as illustrated in FIG. 4, or may be a more complex shape that more closely follows the physical periphery of the tugger body 25, i.e., it may include the projections of hardware mounted to the tugger body 25 such as racks, equipment, attachment points, and the like, or include one or more articulation boundaries like the one shown in FIG. 1. For example, and not by way of limitation, the dynamic exterior boundary 13 may be represented by a polygon such as a box, square, circle, trapezoid, triangle, and the like. FIG. 4 illustrates an embodiment where the dynamic exterior boundary 13 is a rectangle that encapsulates the tugger body 25 and any projections of hardware mounted to the tugger body 25 such as racks, equipment, attachment points, articulation boundaries, and the like. The coupling device 18 removably couples with a tugger coupling device 26 (FIG. 5) of a trailer 50, which is shown in FIG. 5. Collectively, the tugger 20 and trailer 50 form a materials handling vehicle.

Characteristics specific to the tugger 20 may be identified and recorded in the vehicle data 260 (FIG. 3) for use by the path validation tool. Referring to FIG. 4, the vehicle data may comprise tugger type, wheel_type (e.g., quantity and location of steered wheels 22 and fixed wheels 24), wheelbase dimensions between the one or more wheels of the tugger 20 (e.g., the dimensions between the steered wheel 22 and the fixed wheels 24), rear_hitch dimensions, a kinematic center C of the tugger 20, and the like. It is noted that the rear_hitch dimensions include a distance $D_{rear\_hitch}$ measured from the distal end 23 of the coupling device 18 to the kinematic center C. Configuration data 250 (FIG. 3) may comprise data representing clearance boundary data which may be an offset distance from the dynamic exterior boundary 13 of the tugger 20.

Referring to FIG. 5, one embodiment of a trailer 50 is shown, specifically, a caster steer trailer which comprises one or more fixed wheels 24, one or more caster wheels 27, and one or more tugger coupling devices 26. Characteristics of the trailer 50 may comprise trailer type (e.g., caster steer trailer), wheel_type (e.g., quantity and location of caster wheels 27 and fixed wheels 24), wheelbase dimensions between the one or more wheels of the trailer 50 (e.g., the dimensions between the caster wheels 27 and the fixed wheels 24), rear_hitch dimensions, front_hitch dimensions, a kinematic center C of the trailer 50, and the like. It is noted that the rear_hitch dimensions include a distance $D_{rear\_hitch}$ measured from the distal end 23 of the rear tugger coupling device 26a to the kinematic center C, and the $_{front\_hitch}$ dimensions include a distance $D_{front\_hitch}$ measured from the distal end 23 of the front trailer coupling device 26b to the kinematic center C. Configuration data 250 (FIG. 3) may comprise data representing a dynamic clearance boundary which may be an offset distance from the dynamic exterior boundary 13 of the trailer 50.

Figure 6:
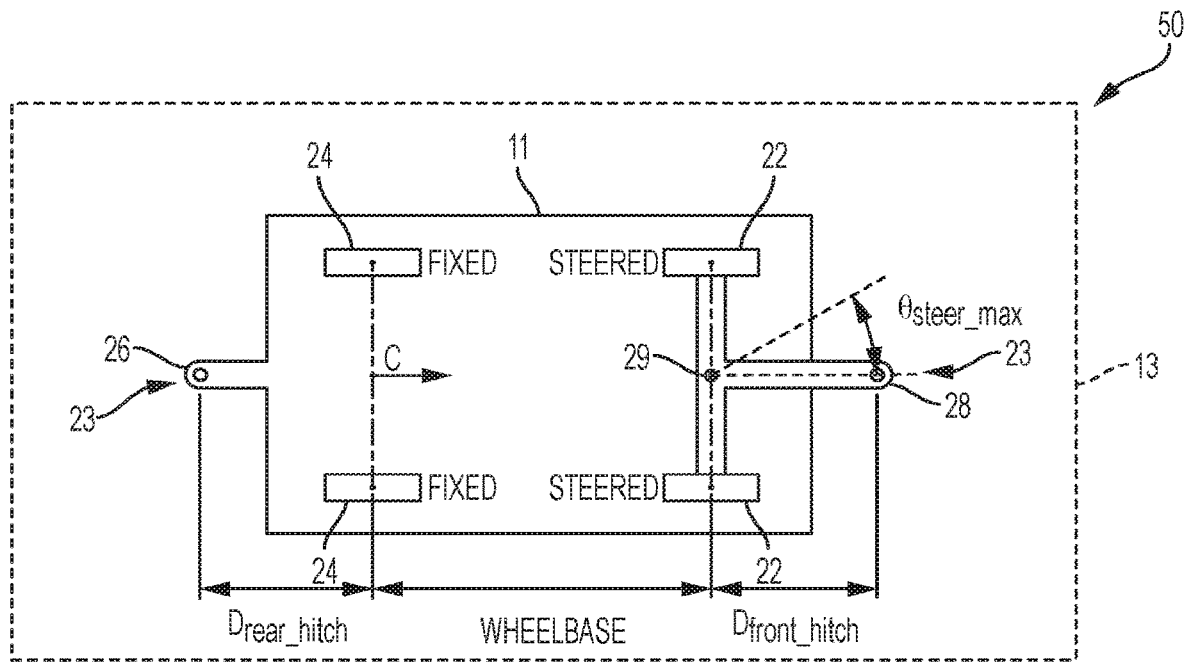
FIG. 6 depicts another embodiment of the trailer according to one or more embodiments shown and described herein.

FIG. 6 is one embodiment of the trailer 50, specifically a two-wheel steer trailer which comprises one or more fixed wheels 24, one or more steered wheels 22, a tugger coupling device 26, and a steered coupling device 28. Characteristics of the trailer 50 may comprise trailer type (e.g., two-wheel steer trailer), wheel_type (e.g., quantity and location of steered wheels 22 and fixed wheels 24), wheelbase dimensions between the one or more wheels of the trailer 50 (e.g., the dimensions between the steered wheels 22 and the fixed wheels 24), rear_hitch dimensions, front_hitch dimensions, a kinematic center C of the trailer 50, a max_steer angle ($\theta$steer_max) of the steered coupling device 28, and the like. It is noted that the rear_hitch dimensions include a distance $D_{rear\_hitch}$ measured from the distal end 23 of the rear tugger coupling device 26a to the kinematic center C, and the $_{front\_hitch}$ dimensions include a distance $D_{front\_hitch}$ measured from the distal end 23 of the steered coupling device 28 to the steered pivot point 29. The max_steer angle is measured in relation of rotation of the distal end 23 of the steered coupling device 28 around a steered pivot point 29. Configuration data 250 (FIG. 3) may comprise clearance polygon data which may be an offset distance from the dynamic exterior boundary 13 of the trailer 50.

Figure 7:
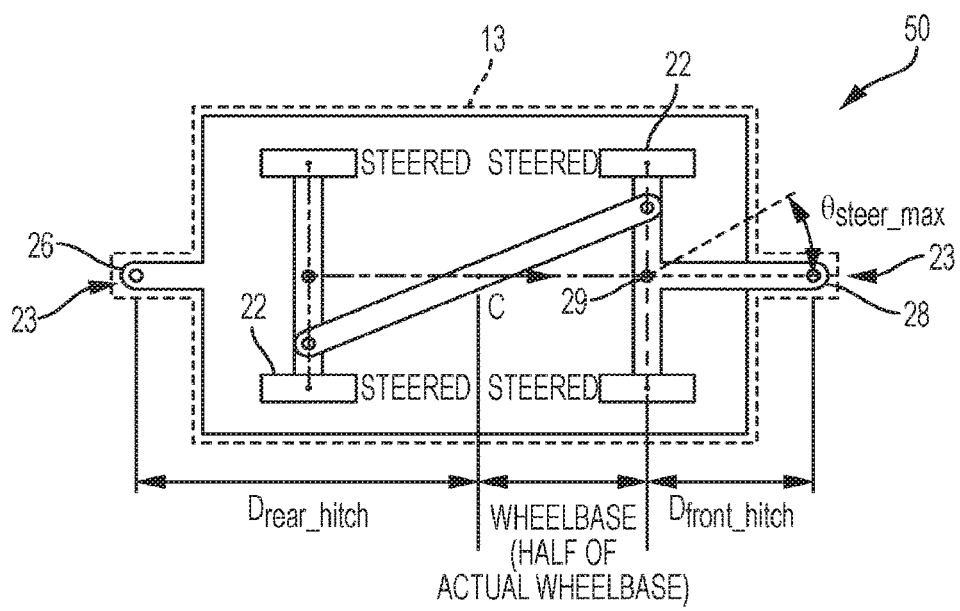
FIG. 7 depicts another embodiment of the trailer according to one or more embodiments shown and described herein.

FIG. 7 is one embodiment of the trailer 50, specifically a four-wheel steer trailer which comprises one or more steered wheels 22, a tugger coupling device 26, and a steered coupling device 28. Characteristics of the trailer 50 may comprise trailer type (e.g., four-wheel steer trailer), wheel_type (e.g., quantity and location of steered wheels 22), wheelbase dimensions between the one or more wheels of the trailer 50 (e.g., half the distance between the steered wheels 22), rear_hitch dimensions, front_hitch dimensions, a kinematic center C of the trailer 50, a max_steer angle of the steered coupling device 28, and the like. It is noted that the rear_hitch dimensions are measured from the distal end 23 of the rear tugger coupling device 26a to the kinematic center C and the front_hitch dimensions are measured from the distal end 23 of the steered coupling device 28 to the steered pivot point 29. The max_steer angle is measured in relation of rotation of the distal end 23 of the steered coupling device 28 around a steered pivot point 29. Configuration data 250 (FIG. 3) may comprise data representing the dynamic exterior boundary and the dynamic clearance boundary, both of which are offset from the physical periphery of the trailer 50.

Referring back to FIG. 3, the path validation tool models a materials handling vehicle and one or more trailers to define the motion of the materials handling vehicle and one or more trailers around a path in a warehouse. The path validation tool predicts the position of the materials handling vehicle and one or more trailers, if coupled to the materials handling vehicle, at any point along the path in the warehouse. The materials handling vehicle, including each trailer, is defined by a dynamic exterior boundary 13 (FIGS.

4-7) along with its kinematic center C (FIGS. 4-7), by the path validation logic 240, and by the data stored in the data storage 245. The path validation tool determines the pose (i.e., orientation, position and heading) of the materials handling vehicle, including one or more trailers, in relation to the path at regular, pre-determined intervals (i.e., at every fixed distance interval along the path) and identifies if there are any projected intersections between each trailer, between the trailers and the materials handling vehicle, and/or between the materials handling vehicle and any obstacles in the warehouse. For example, and not by way of limitation, the path validation tool may calculate the pose of the materials handling vehicle, including trailers, along the path at every 5 cm of travel distance along the path. Further, in embodiments, the materials handling vehicle 10 may include a tugger 20 and one or more trailers 50 coupled to the tugger 20. The dynamic vehicle boundary may approximate a physical periphery of the tugger 20 of the materials handling vehicle 10, and a potentially intersecting obstacle is a trailer 50 of the one or more trailers 50 coupled to the tugger 20. Alternatively, the dynamic vehicle boundary may approximate a physical periphery of a trailer 50 of the one or more trailers 50 of the materials handling vehicle 10, and a potentially intersecting obstacle is another trailer 50 of the one or more trailers 50 coupled to the trailer 50. In another embodiment, the dynamic vehicle boundary may approximate a physical periphery of one of the tugger 20 and the one or more trailers 50 of the materials handling vehicle 10, and a potentially intersecting obstacle is an obstacle represented in the environmental layout data separate from the materials handling vehicle.

For each fixed distance interval along the path, the pose of the materials handling vehicle, including each trailer, if coupled to the materials handling vehicle, is calculated from the prior state or the prior pose at the prior fixed distance interval along the path. For each pose of materials handling vehicle 10 and one or more trailers 50, their respective exterior and clearance polygons are calculated for that pose and checked for intersection with any obstacle in a quad tree. Obstacle observations will be maintained in a quad tree to allow high efficiency spatial queries, with bounds large enough to cover the entire path plus the range of the laser scanner including its positional offset. The quad tree is able to contain obstacles in the form of points and lines, or any other necessary form. The quad tree provides high efficiency lookup of nearby obstacles for intersection checks. The quad tree returns a shortlist of potentially intersecting candidates, greatly reducing the number of intersection checks. It is noted that quadtree-based spatial queries are well documented in the art and it is contemplated that a variety of different quadtree configurations may be implemented within the scope of the present disclosure.

Each polygon (such as a dynamic vehicle boundary illustrated in FIG. 1) for the materials handling vehicle, and all connected trailers, is checked for intersection (i.e., collision, or intrusion) with another polygon or obstacle in the warehouse. This allows early exit if an intersection is found and return or output of the failure condition. If an intersection is found, the path validation tool will provide the position along the path, the materials handling vehicle, trailer, and/or obstacle affected by the intersection, and an impingement distance. The impingement distance is an overlap distance of two or more polygons and/or one or more polygons with one or more obstacles and may be used to modify or revise the path to avoid the obstacle or used to modify the turn radius or hitch length of each trailer to avoid pinching between trailers or between the trailer and materials handling vehicle. Thus, a degree of potential impingement may include an impingement distance that is an overlap distance at candidate positions indicative of an overlap between the dynamic vehicle boundary of the materials handling vehicle and obstacle data. Any obstacle that intersects any clearance polygon, or the materials handling vehicle and trailers' swept paths will need to be checked for its distance along the path and its impingement distance. This will allow feedback for path modification and notification of hazard zones. The swept path is the area covered by any part of the tugger and trailers as it follows the path and is the combination of all tugger and trailer polygons at all steps along the path.

Referring to FIGS. 1A-1B, two polygons will be used for each calculation at each fixed distance d along the path: (i) a dynamic exterior boundary 13 polygon offset a distance d from the physical periphery of the vehicle and (ii) a dynamic clearance boundary 19 polygon that is expanded relative to the dynamic exterior boundary 13 by an offset distance d' of, for example, 0.5 meters, or whatever distance is suitable in practice. In an embodiment in which the overall dynamic clearance boundary 19 is greater than the overall dynamic exterior boundary 13, each calculation by the path validation tool at each fixed distance interval may use the clearance polygon first. If an intersection is not identified with the dynamic clearance boundary, then a second calculation using the dynamic exterior boundary is not done.

The dynamic exterior boundary 13 may be a polygon that contains the physical extents of all active scan fields, which are configured to match the fields contained on one or more sensors coupled to the materials handling vehicle 10. For example, the one or more sensors may include a camera, 3D camera (e.g., Time of Flight), 2D and/or 3D laser scanners, radar array, ultrasonic array, or other scan system devices configured to generate an active scan field such that an obstacle impinging on the active scan field will cause the vehicle to stop. A scan system as described herein may refer to a device onboard the materials handling vehicle 10 that is configured to quickly and reliably halt the materials handling vehicle 10 if any active scan field contains an obstacle. The device may select the active scan field from a list of potential scan fields based on a speed and steering angle of the materials handling vehicle 10. An active scan field as referenced herein may be a physical area relative to the industrial vehicle that is monitored by the scan system for a given speed and steering angle of the materials handling vehicle 10. A dynamic exterior boundary 13 as described herein may refer to a dynamic shape that contains a physical outline of the materials handling vehicle 10 in addition to any active scan fields and may include a slightly larger dimension to provide for a margin for error. For example, in one embodiment, referring to FIG. 11, there may be an active scan field 38 projected from a leading edge of the materials handling vehicle 10 that is configured to identify one or more obstacles in front of or lateral to the materials handling vehicle 10 along a physically swept area 39 disposed around a travel path 37. The physically swept area 39 may be sufficiently wide to encompass a width of the materials handling vehicle 10 along with variations of the travel path 37 that occur in response to obstacle detection. In embodiments, the dynamic exterior boundary 13 and/or the travel path 37 may be generated or modified based on obstacle(s) identified by at least the active scan field 38.

The dynamic clearance boundary 19 may be a polygon generated with respect to a periphery of the materials handling vehicle 13. A dynamic clearance boundary 19 as described herein may refer to a dynamic shape that contains a physical outline of the materials handling vehicle 10 in addition to an expansion area defined by a constant clearance distance and may also include a slightly larger dimension to provide for a margin for error. In embodiments, the dynamic clearance boundary 19 may be impinged in a hazard zone such that the vehicle is permitted to continue to be navigated as long as the dynamic exterior boundary 13 is not impinged. Further, in embodiments, portions of the dynamic exterior boundary 13 may be larger than portions of the dynamic clearance boundary 19. For example, one or more portions of the dynamic exterior boundary 13 may be larger than portions of the dynamic clearance boundary 19, while other portions of the dynamic exterior boundary 13 may be smaller than portions of the dynamic clearance boundary 19. In embodiments in which portions of the dynamic exterior boundary 13 may be greater than the dynamic clearance boundary 19, each calculation by the path validation tool at each fixed distance interval may use both the clearance polygon and the exterior polygon. For example, a left side portion of the vehicle may have a dynamic exterior boundary 13 that is larger than the dynamic clearance boundary 19, and a right side portion of the vehicle may have a dynamic exterior boundary 13 that is smaller than the dynamic clearance boundary 19. Whenever an intersection or impingement is found with respect to the dynamic exterior boundary 13 at any portion, the vehicle will stop. Further, while in some instances the vehicle may stop or execute obstacle avoidance when an intersection is found for a portion of the dynamic clearance boundary 19 but not the dynamic exterior boundary 13, the vehicle may in other instances continue with navigation if the vehicle is in a hazard zone when the intersection of the portion of the dynamic clearance boundary 19 is identified. Thus, as a non-limiting example, an intersection may not be identified for the left side portion of the vehicle having the dynamic exterior boundary 13 that is larger than the dynamic clearance boundary 19, while an intersection may be identified for the dynamic clearance boundary 19 of the right side portion of the vehicle having a dynamic exterior boundary 13 that is smaller than the dynamic clearance boundary 19 (but not identified for the dynamic exterior boundary 13). In such a detected situation, obstacle avoidance may occur. However, if the vehicle is in a hazard zone during this detected situation, the obstacle scanning tool may not employ obstacle avoidance and the vehicle may continue with navigation along the travel path. A hazard zone as described herein may refer to an area in a warehouse in which it is allowable for pinch points to occur. Such an area may include warning signs and may not permit pedestrian entry and accessibility.

Intersection of any polygon will result in the impingement distance being calculated and the intersection will be added to the list of data for each intersection. Data for each intersection includes, but is not limited to, the type of intersection, the intersection distance, the angle of intersection, and the distance along the path at which the intersection occurs. In embodiments, a pinch point as referenced herein refers to a location in a warehouse where any physical part of the materials handling vehicle 10 (e.g., one or more tugger and/or trailer portions) approaches within a specified clearance distance of any stationary physical object in a warehouse. The specified clearance distance may be, for example, 0.5 meters. Such clearance distances are representative of a location clearance to permit pedestrian accessibility, for example.

Figure 8:
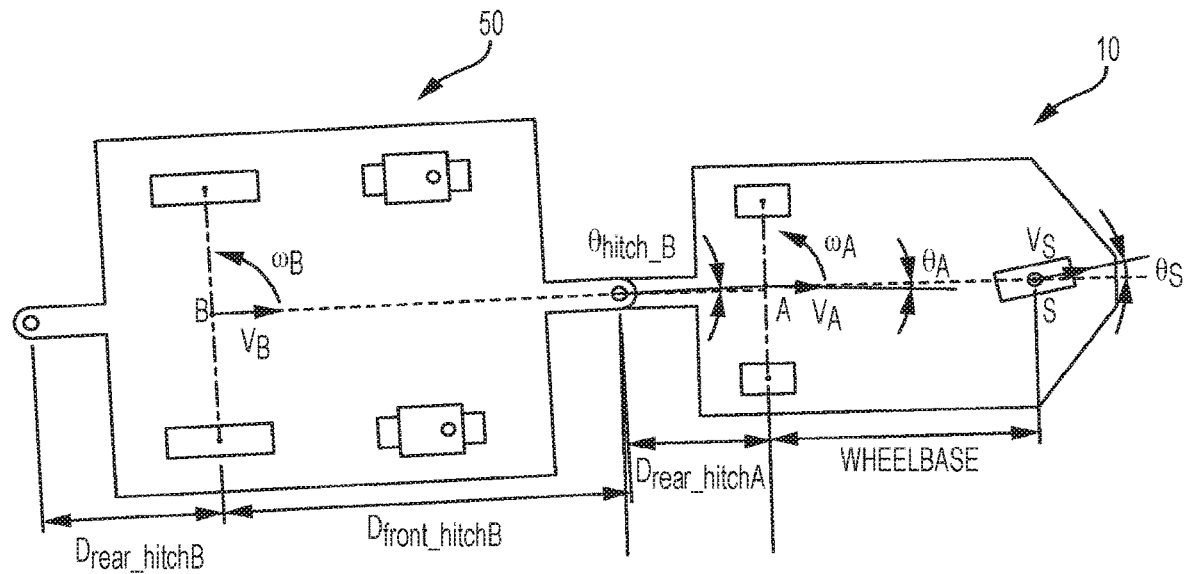
FIG. 8 depicts a tugger and a trailer according to one or more embodiments shown and described herein.

Referring now to FIG. 8, the path validation tool calculates the steer wheel velocity $V_S$ and steering angle $\theta_S$ of the materials handling vehicle 10 to dictate the linear velocity $V_A$ (Eq. 1) and rotational velocity $\omega_A$ (Eq. 2) of the materials handling vehicle 10.

$$V_A = V_S \cdot \cos\theta_s \qquad \text{Eq. 1}$$

$$\omega_A = \frac{V_S \cdot \sin\theta_s}{\text{wheelbase}} \qquad \text{Eq. 2}$$

These velocities of the materials handling vehicle 10 are used to determine the subsequent trailer's 50 (i.e., the first trailer 50 coupled to the materials handling vehicle 10) linear $V_B$ (Eq. 3) and rotational $\omega_B$ (Eq. 4) velocities. Each trailer's linear $V_B$ and rotational $\omega_B$ velocities are used to determine those of the subsequent trailer 50 (i.e, second, third, etc.) by the same method.

$$V_B = V_A \cdot \cos\theta_{hitchB} - \omega_A \cdot D_{rearHitchA} \cdot \sin\theta_{hitchB} \qquad \text{Eq. 3}$$

$$\omega_B = -\frac{V_A \cdot \sin\theta_{hitchB}}{D_{frontHitchB}} - \frac{\omega_A \cdot \cos\theta_{hitchB} \cdot D_{rearHitchA}}{D_{frontHitchB}} \qquad \text{Eq. 4}$$

Figure 9:
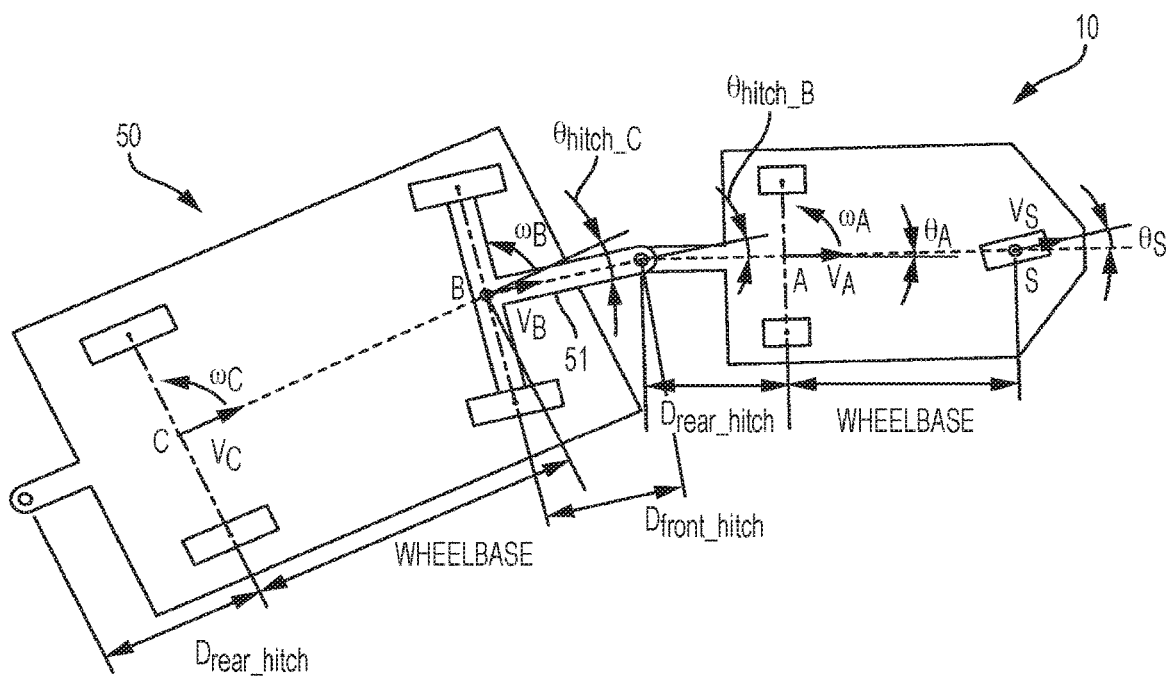
FIG. 9 depicts another embodiment of the tugger and trailer according to one or more embodiments shown and described herein.

Referring now to FIG. 9, steered trailers 50 are modeled as a set of two basic trailers (e.g., trailer 50 shown in FIG. 8), where the first 'trailer' is modeled using the characteristics of a front_hitch bar 51 that has the rear_hitch distance set to zero, and the 'second' trailer is modeled as a basic trailer as shown and described above in relation to FIG. 8. A steered trailer is modelled as two basic trailers in a row, with the first trailer having a wheelbase of zero.

Figure 10:
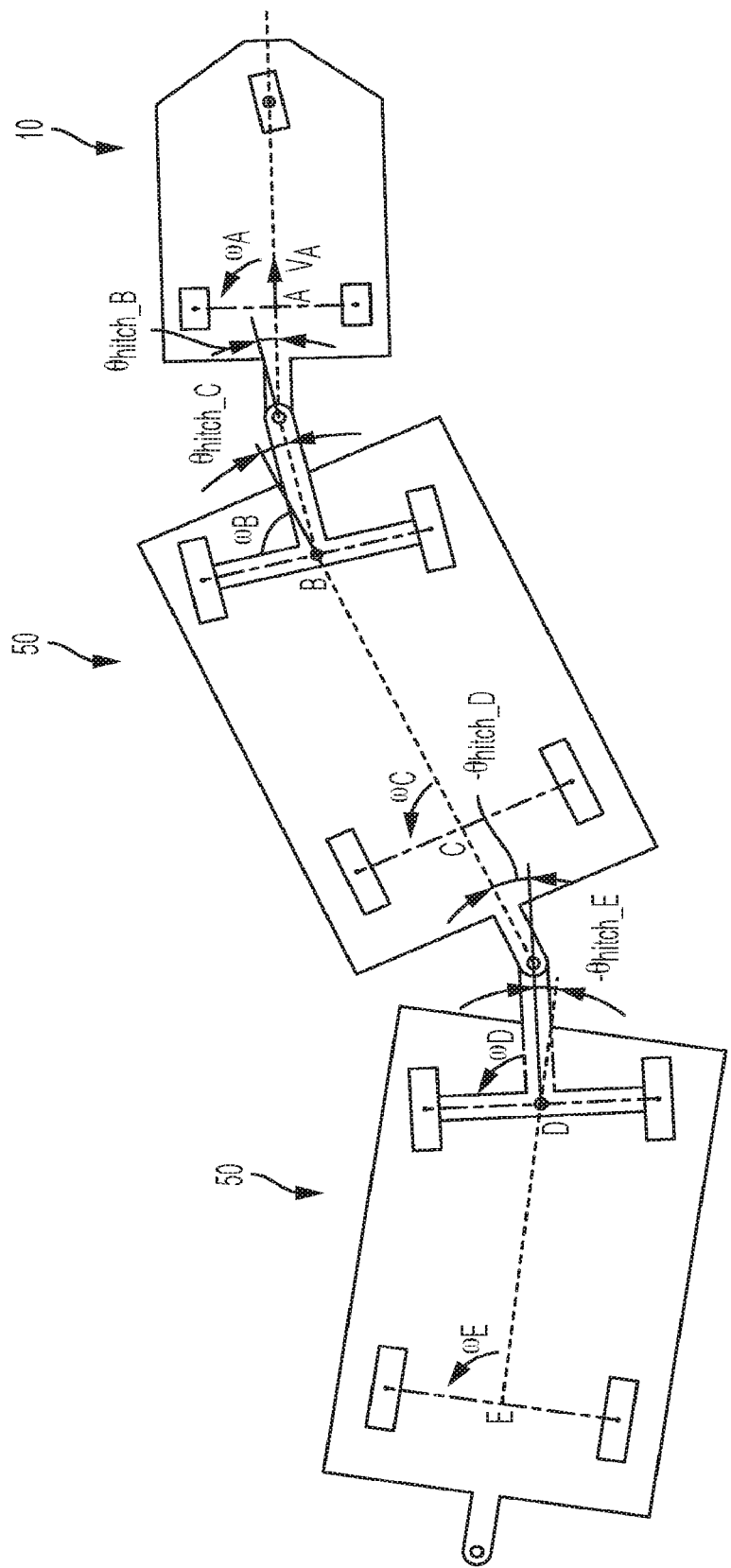
FIG. 10 depicts another embodiment of the tugger and one or more trailers according to one or more embodiments shown and described herein.

FIG. 10 depicts another embodiment of the path validation tool where, instead of using linear and rotational velocities to model the materials handling vehicle and/or trailers along a path, the change in distance and heading along the path are used. Further calculations would no longer include the integration by time step. This could be considered as dividing the pose changes by one second to get speeds, then integrating over one second to get the same pose changes.

Integrating the materials handling vehicle 10 velocities gives the pose of the materials handling vehicle 10 at each time step. Integrating the rotational velocity of each trailer 50 relative to the prior one gives the relative angle of each trailer 50. It should be noted, for steered trailers, that they are modeled as two trailers as discussed above.

$$\theta_{hitchB} = \theta_{hitchB} + t_s(\omega_B - \omega_A) \qquad \text{Eq. 5}$$

$$\theta_{hitchC} = \theta_{hitchC} + t_s(\omega_C - \omega_B) \qquad \text{Eq. 6}$$

These angles are sufficient to fully define the trailer poses by working backward from the materials handling vehicle pose at each time step. Still referring to FIG. 10, the state is defined by the pose (x, y, θ) of A, and a list of relative angles. Given the trailer details (hitch lengths and wheelbase), B is calculated as:

$$\text{Hitch} \begin{cases} B_x = A_x - D_{rearHitchA} \cdot \cos A_\theta - D_{frontHitchB} \cdot \cos(A_\theta + \theta_{hitchB}) \\ B_y = A_y - D_{rearHitchA} \cdot \sin A_\theta - D_{frontHitchB} \cdot \sin(A_\theta + \theta_{hitchB}) \\ B_\theta = A_\theta + \theta_{hitchB} \end{cases} \quad \text{Eq. 7}$$

$$\text{Trailer} \begin{cases} C_x = B_x - \text{wheelbase} \cdot \cos(A_\theta + \theta_{hitchC}) \\ C_y = B_y - \text{wheelbase} \cdot \sin(A_\theta + \theta_{hitchC}) \\ C_\theta = B_\theta + \theta_{hitchC} \end{cases} \quad \text{Eq. 8}$$

All subsequent poses are then calculated in order as discussed above.

Figure 11:
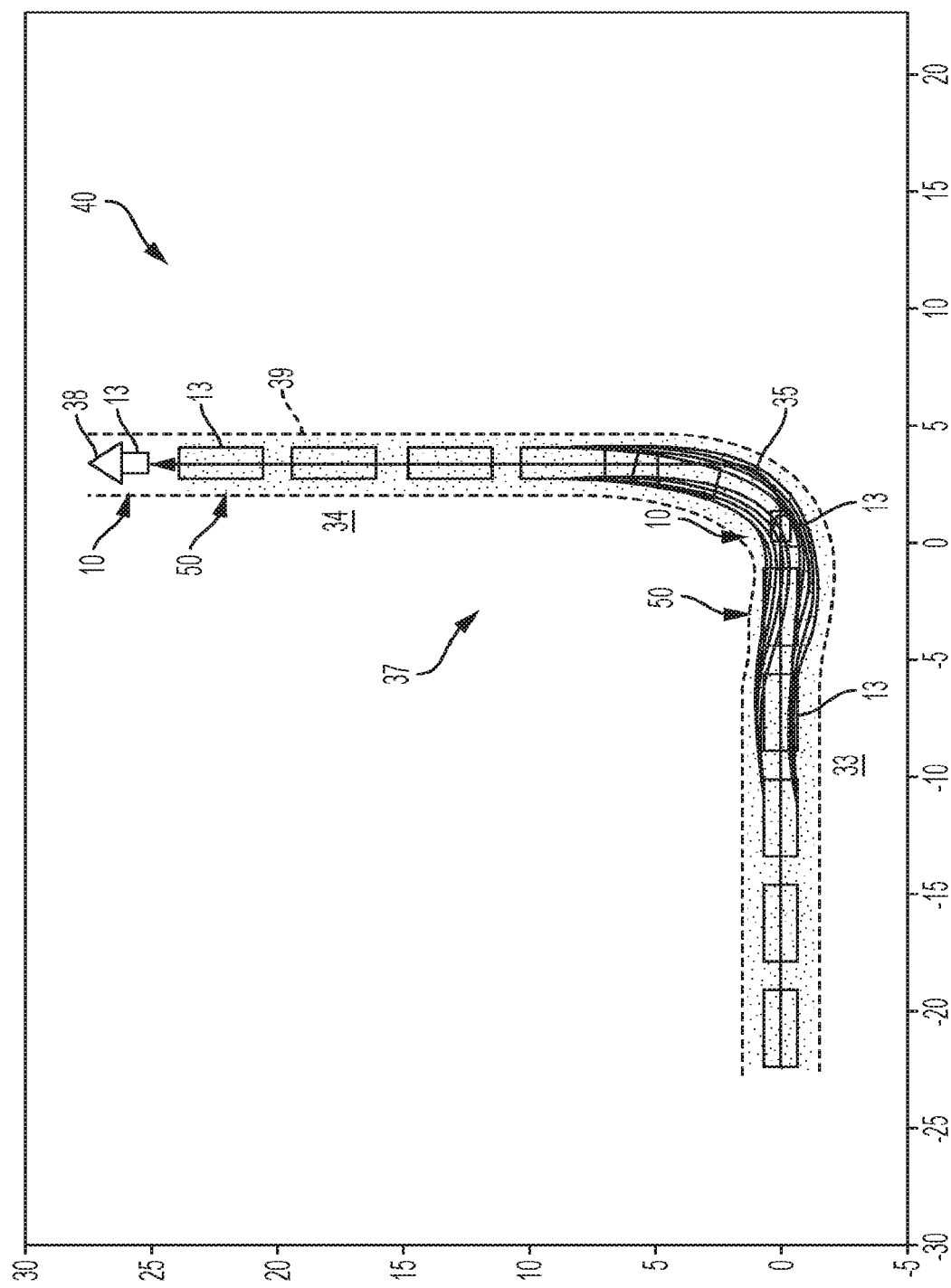
FIG. 11 depicts intersection calculations along a path in a warehouse according to one or more embodiments shown and described herein.

FIG. 11 generally depicts one embodiment of a path validation tool to verify the operation of a materials handling vehicle along a path in a warehouse. The path validation tool generally comprises environmental layout data of the warehouse, a proposed path within the warehouse and corresponding to the environmental layout data, data on the materials handling vehicle to include exterior dimensions, turning radius, if one or more trailers are part of the vehicle, data on each trailer, obstacle data within the warehouse, and the like. The path validation tool will overlay a clearance space around the external dimensions of the materials handling vehicle, including trailers, and evaluate whether the clearance space intersects with obstacles in the warehouse, pointing out pinch points and collisions. It will also overlay collisions between various moving parts of the materials handling vehicle (e.g., one or more trailers and tugger). The path validation tool can either highlight problem areas with the configuration of the materials handling vehicle or with the proposed path in the warehouse. Thus, the path validation tool may execute path validation logic to identify the degree of potential impingement at the candidate positions as one or more problem areas of at least one of the proposed travel path and a configuration of the materials handling vehicle with respect to the proposed travel path. An existing path (taught or created) can be verified by the path validation tool before implementation in the warehouse by, for example, automated guided vehicles (AGV). Various embodiments of the path validation tool and the operation of the path validation tool are described in detail herein.

For example, referring to FIG. 11, the calculated intersections by the path validation tool are shown in relation to the movement of the materials handling vehicle 10 and, if used, one or more trailers 50 in the warehouse 40. FIG. 11 depicts a first position 33 and a second position 34 of a materials handling vehicle 10 and one or more trailers 30 around a turning point 35 along a path 37 in a warehouse 40. The first position 33 and the second position 34 are positions along the path 37 before and after the turning point 35, respectively. The path validation tool is used to validate paths in a warehouse, such as, for example, the warehouse 40, and ensure the clearance polygons of the materials handling vehicle 10 and trailers 50 will not be crossed and pinch points will not occur between the materials handling vehicle 10 and trailers 50 and/or between trailers 50, and report where such cases do occur. It is contemplated that the paths may be modified to overcome any identified issues with the path by the path validation tool. Pinch points are locations within the warehouse where the materials handling vehicle (e.g., one or more trailers and/or the two vehicles) approach within a defined distance of a structure, equipment, or an obstacle. The defined distance may be, for example and not by way of limitation, 0.5 meters. Hazard zones are areas within the warehouse where pinch points are located. The path validation tool may use hazard zones defined in a warehouse map to disregard reporting of clearance impingements that occur in those areas. Further, the path validation tool may define the materials handling vehicle velocity, turning radius, etc. for one or more zones to maintain clearance and prevent collisions in those one or more zones.

The environmental data 255 (FIG. 3) and configuration data 250 (FIG. 3) are populated and used by the path validation tool to represent the operational conditions of the materials handling vehicle 10 and one or more trailers 50, if used, in the warehouse 40.

The aforementioned dynamic exterior and clearance boundaries 13, 19 of the materials handling vehicle 10, including trailers 50, may be represented in Cartesian coordinates relative to the vehicle's kinematic center. These boundaries have a steering range within which they are active. The steering range is defined by the minimum and maximum steering angles of the materials handling vehicle 10, including any trailers 50. It is contemplated that the aforementioned dynamic exterior and clearance boundaries 13, 19 will change based on vehicle speed and steering angle. In addition, the respective shapes of the exterior and clearance boundaries 13, 19 may change as the materials handling vehicle 10, including any trailers 50, progress along the path, particularly where collisions are more likely to occur.

It is contemplated that, in some embodiments, there will be a minimum distance d by which the dynamic exterior boundary 13 will be offset from the physical periphery of the vehicle for all steering angles of the materials handling vehicle 10, including any trailers 50. In other embodiments, there will be a minimum speed scan field represented by the exterior and clearance boundaries 13, 19 and this minimum scan field will be required regardless of the steer angle. The materials handling vehicle 10, including any trailers 50, will slow down as it/they approach obstacles. In which case, higher vehicle speeds need not be considered, and the minimum speed scan field would be the limiting factor in vehicle travel planning. In most cases, it will be advantageous to ensure that the dynamic exterior boundary 13 is configured to match the operational parameters of the particular materials handling vehicle in use for optimum operation of the path validation tool of the present disclosure.

A path is an ordered collection of path segments consisting of straight, arc, and clothoid types. The path may be created or received in the path validation tool and/or it may be derived from data taken from sensors on a materials handling vehicle driven along the path in the warehouse. For example, and not by way of limitation, the localization system of the materials handling vehicle may be used to track the progress of a materials handling vehicle that is manually driven through the warehouse and the subsequent data is loaded into the path validation tool.

Obstacles are defined in absolute warehouse Cartesian coordinates. They are point obstacles that may be flagged as fixed infrastructure (i.e. cannot be deleted from the quadtree). The path validation tool may also accept a simultaneous location and mapping (SLAM) log data, data from environment laser scans, and will use the resulting path to insert obstacles by repeatedly applying the described single laser scan method. For example, and not by way of limitation, laser scan data will be passed into path validation tool, along with laser scanner parameter data, which will generate obstacles that are inserted into the quad tree. Any unobserved obstacle will be deleted when a laser scan should have, but fails to, detect it. This deals with pedestrians and vehicles that enter the laser scan range and then leave.

In the case where a path is defined, the velocities are not available and the motion is a series of direct changes in pose. The calculations are the same except distances are used instead of velocities and the integration time step is set to one. Smaller distance steps will result in better fidelity of the trailer paths.

It is contemplated that the path may be modified through use of segments. The calling function may get results for modified paths faster if it splits the nominal path into shorter lengths. This would prevent recalculation of earlier unchanging segments as the end of the path is determined. Each of these segments should have all alternatives and their results stored, as the apparent best segment may not be the best if it leads to problems further along the path. The number of pinch points for the entire path should be minimized. Additionally, checking a shorter section of path would give quicker iterations. The sections should not be split near a turn, or perhaps splits should be concentrated at turns. In any case, the path validation tool may, in some cases, need to backtrack quite a distance to deal with long trailer trains. The path validation tool should be able to be set to exit early if there is a collision at any point. In this case it is still important to complete analysis of pinching paths, as that could be the optimal path and a hazard zone is necessary.

It is contemplated that one or more inputs for the path validation tool are, but not limited to: a tugger type, a scan field set, a trailer type, a quantity of trailers, initial (starting) angles of the trailers, an AGV path, and/or a list of obstacles. It is contemplated that one or more outputs for the path validation tool are, but not limited to: a determination of: whether any intrusion field, or any part of the tugger and trailer(s), will intersect any obstacle; whether any part of the tugger and trailer(s) will approach within pinch point distance of any obstacle; the maximum steering angle of the tugger, or any trailer, is exceeded at any distance along the path; if any of the tugger and trailers intersect each other; and for each obstacle impinging on the pinch point clearance, report the distance along the path and the impingement distance; and show resultant hazard zones.

Figure 12:
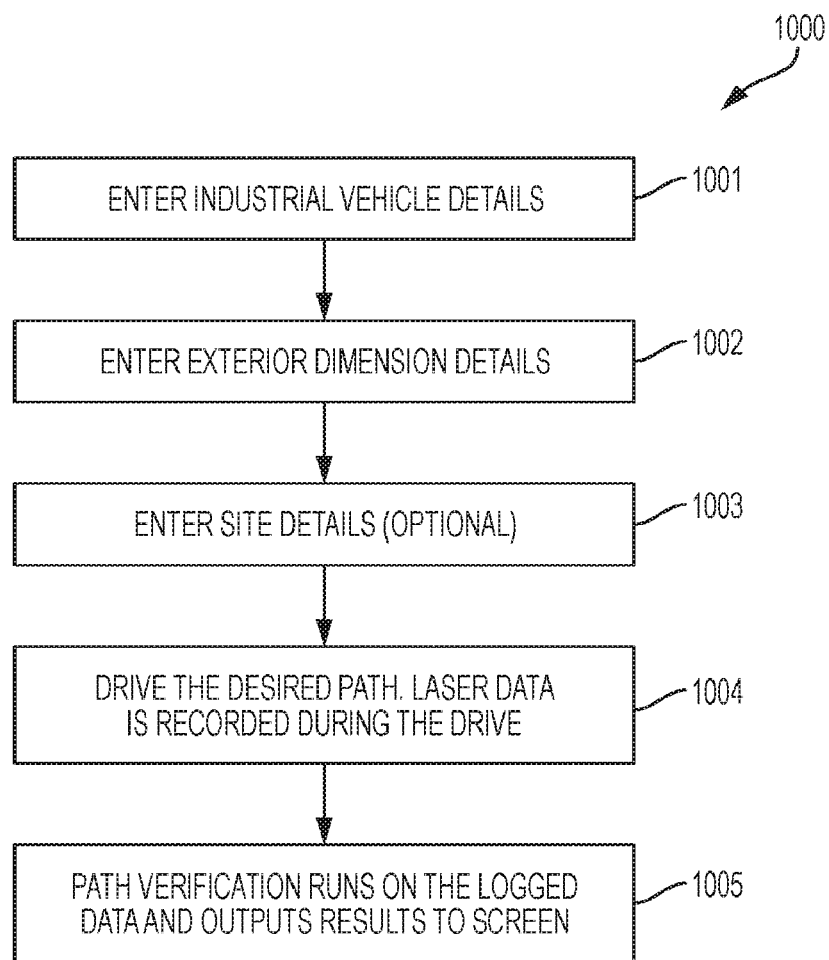
FIG. 12 depicts one or more steps to verify a path according to one or more embodiments shown and described herein.

FIG. 12 details through a process 1000 one or more steps 1001-1005 to verify the path using the path validation tool. It is noted that, while the functions are enumerated and depicted as being performed in a particular sequence in the depicted embodiment, the functions can be performed in an alternative order without departing from the scope of the present disclosure. It is furthermore noted that one or more of the functions can be omitted without departing from the scope of the embodiments described herein.

As shown in FIG. 12, to verify the path of one or more vehicles using the path validation tools, a user may first enter details about the one or more materials handling vehicles, such as, for example, hitch length or wheel base or other appropriate details as shown in block 1001. Next, the user may enter details regarding the appropriate exterior dimensions as shown in block 1002. Optionally, the user may enter details about the warehouse site or industrial site as shown in block 1003. As shown in block 1004, the desired path may be driven and laser data may be recorded during the drive. In block 1005, path verification runs on the logged data and results are output to one or more screens.

In embodiments, and as described above with respect to FIGS. 1-2, a materials handling vehicle 10 may include a vehicle body 11, materials handling hardware 15, one or more wheels 16, a drive unit D, a steering unit S, a localization module L, a navigation module N, and a path validation tool P, such that the drive unit D, steering unit S, localization module L, and navigation module N cooperate to direct the materials handling vehicle 10 along a travel path 37 (FIG. 11) in a warehouse 40.

Figure 13:
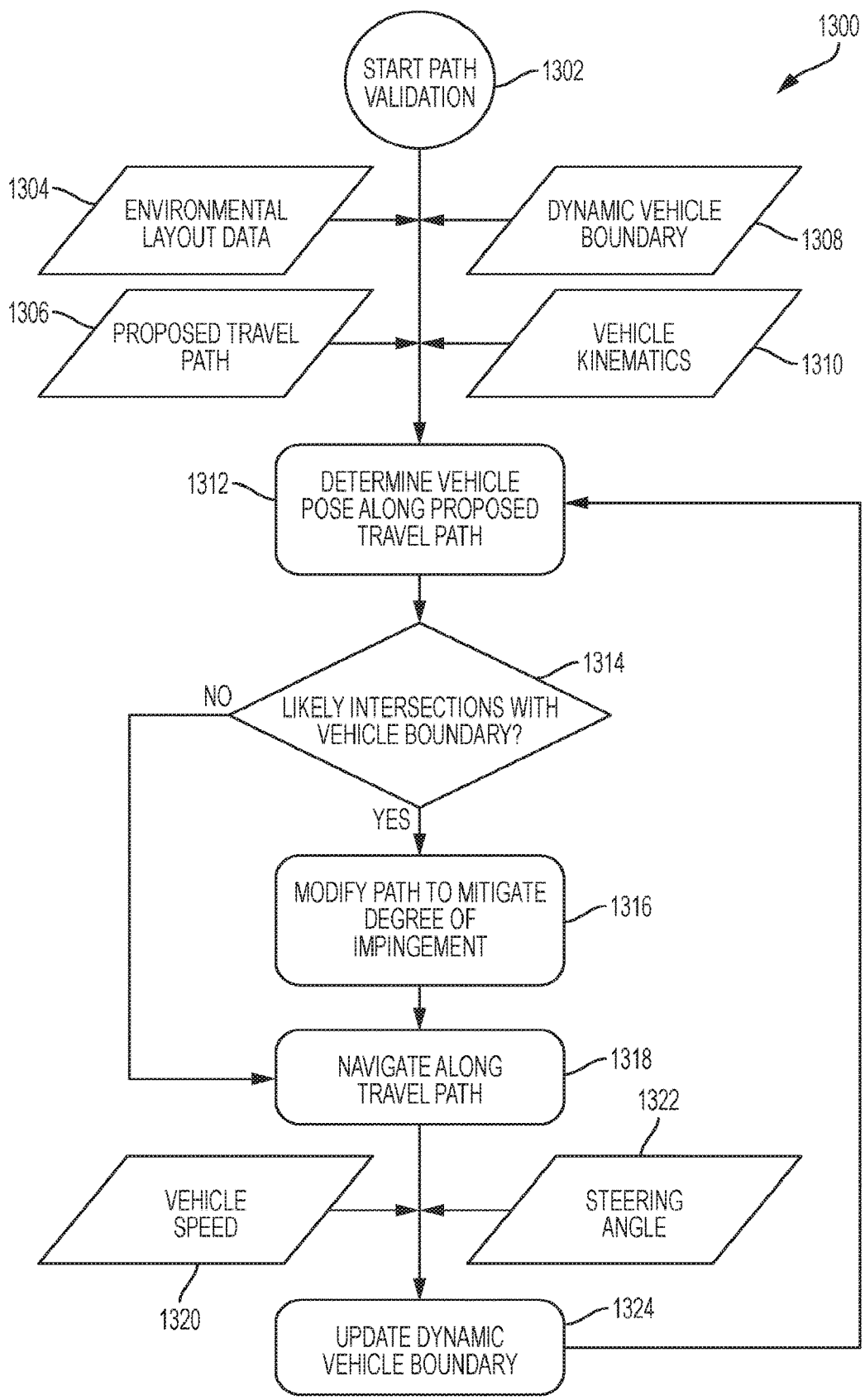
FIG. 13 depicts a process to update a dynamic vehicle boundary according to one or more embodiments shown and described herein.

In an embodiment, and referring to a process 1300 of FIG. 13, the path validation tool P includes environmental layout data of the warehouse, a proposed travel path within the warehouse, kinematics of the materials handling vehicle 10, and a dynamic vehicle boundary of the materials handling vehicle 10. The process 1300 starts path validation at block 1302.

A method of executing path validation logic may include receiving a plurality of inputs into the path validation tool P. One or more inputs 1304-1310 are received by the path validation tool P. For example, the one or more inputs include environmental layout data as an input 1304, a proposed travel path as an input 1306, a dynamic vehicle boundary as an input 1308, and vehicle kinematics as an input 1310. In embodiments, the kinematics of the materials handling vehicle 10 include at least the kinematic center C of the materials handling vehicle 10, and data on the materials handling vehicle 10 to include exterior dimensions, a turning radius, and pose data. The materials handling vehicle 10 may include a tugger 20 and one or more trailers 50 coupled to the tugger 20, and the pose data may be indicative of pose data respectively of the tugger 20 and the one or more trailers 50. Further, the dynamic vehicle boundary of the materials handling vehicle 10 may approximate the physical periphery of the materials handling vehicle 10.

The method may further include determining vehicle pose as, for example, the path validation tool P executes path validation logic to, in block 1312, determine vehicle pose along the proposed travel path. The method may include updating the dynamic vehicle boundary. For example, the logic may further be executed to update the dynamic vehicle boundary in block 1324 to account for changes in vehicle speed received as an input 1320 and changes in steering angle received as an input 1322. The logic may be executed to determine, in block 1314, whether the dynamic vehicle boundary of the vehicle is likely to intersect obstacles represented in the environmental layout data based on the determined vehicle pose at candidate positions along the proposed travel path. The logic may then be further executed to determine a degree of potential impingement at the candidate positions by referring to the dynamic vehicle boundary of the materials handling vehicle and obstacle data represented in the environmental layout data. In embodiments, a degree of potential impingement includes an impingement distance that is an overlap distance between a potentially intersecting candidate and the dynamic exterior boundary 13. Further, the materials handling vehicle 10 may include a tugger 20 and one or more trailers 50 coupled to the tugger 20, and the potentially intersecting candidate is one of the tugger 20, a trailer 50, and an obstacle 52 represented by obstacle data in the environmental layout data. For example, the potentially intersecting candidate may be a trailer 50. The overlap distance may be defined between the trailer 50 and the dynamic exterior boundary 13 of the tugger 20 of the materials handling vehicle 10. Alternatively, the overlap distance may be defined between the trailer 50 and the dynamic exterior boundary 13 of another trailer 50 of the one or more trailers 50 of the materials handling vehicle 10. In another embodiment, the potentially intersecting candidate is the obstacle 52, and the overlap distance is defined between the obstacle 52 and the dynamic exterior boundary 13 of the materials handling vehicle 10.

In block 1316, the logic may be executed to modify the proposed travel path to mitigate the degree of potential impingement. In block 1318, the drive unit D, the steering unit S, the localization module L, and the navigation module N cooperate to direct the materials handling vehicle 10 along the modified proposed travel path. The method may further include navigating the materials handling vehicle 10 along the modified proposed travel path through cooperation of the drive unit, steering unit, localization module, and navigation module.

In embodiments, the dynamic vehicle boundary of the path validation tool may include a dynamic exterior boundary 13 of the materials handling vehicle 10 and a dynamic clearance boundary 19 of the materials handling vehicle 10.

Referring to FIGS. 1B-1C, the dynamic clearance boundary 19 is enlarged relative to at least a portion of the dynamic exterior boundary 13 of the materials handling vehicle 10 to define an enlarged boundary about at least a portion of the materials handling vehicle 10. The path validation tool P may execute path validation logic to determine in block 1314 whether the dynamic clearance boundary 19 of the materials handling vehicle 10 is likely to intersect obstacles represented in the environmental layout data based on the determined vehicle pose at candidate positions along the proposed travel path. The logic may be further executed to correlate likely points of intersection along the proposed travel path with vehicle pose at the candidate positions along the proposed travel path to build a list of potentially intersecting candidates along the proposed travel path, and to determine the degree of potential impingement at the candidate positions by referring to the list of potentially intersecting candidates, the dynamic exterior boundary 13 of the materials handling vehicle 10, and obstacle data represented in the environmental layout data of input 1304.

Figure 14:
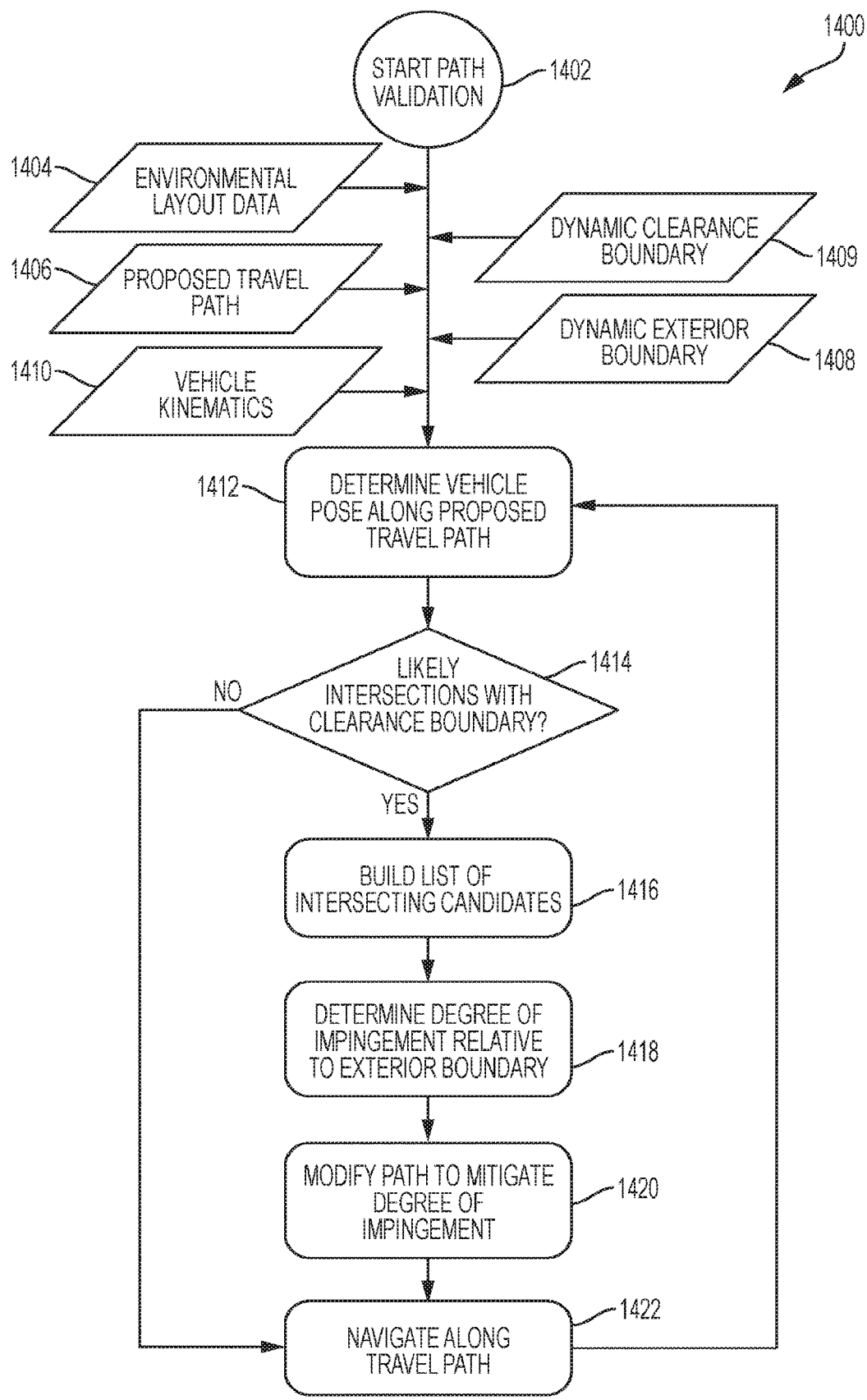
FIG. 14 depicts a path modification process to mitigate a degree of impingement based on a dynamic clearance boundary and a dynamic exterior boundary according to one or more embodiments shown and described herein.

In an embodiment, and referring to a process 1400 of FIG. 14, the path validation tool P includes environmental layout data of the warehouse, a proposed travel path within the warehouse, kinematics of the materials handling vehicle 10, and a dynamic exterior boundary 13 of the materials handling vehicle 10, and a dynamic clearance boundary 19 of the materials handling vehicle 10. The dynamic exterior boundary 13 of the materials handling vehicle 10 approximates the physical periphery of the materials handling vehicle 10. The dynamic clearance boundary 19 is enlarged relative to at least a portion of the dynamic exterior boundary 13 of the materials handling vehicle 10 to define an enlarged boundary about at least a portion of the materials handling vehicle 10.

The process 1400 starts path validation at block 1402. One or more inputs 1404-1410 are received by the path validation tool P. For example, the one or more inputs include environmental layout data in block 1404, a proposed travel path in block 1406, a dynamic clearance boundary 19 as an input 1409, a dynamic exterior boundary 13 as an input 1408, and vehicle kinematics as an input 1410. The path validation tool P may execute path validation logic to determine vehicle pose along the proposed travel path in block 1412. In block 1414, the logic may be executed to determine whether the dynamic clearance boundary 19 of the materials handling vehicle 10 is likely to intersect obstacles represented in the environmental layout data based on the determined vehicle pose at candidate positions along the proposed travel path. Thus, a method of executing path validation logic may include correlating likely points of intersection along the proposed travel path with vehicle pose at the candidate positions along the proposed travel path to build a list of potentially intersecting candidates along the proposed travel path through the path validation tool.

For example, in block 1416, a list of intersecting candidates is built. For example, the logic may be executed to correlate likely points of intersection along the proposed travel path with vehicle pose at the candidate positions along the proposed travel path to build a list of potentially intersecting candidates along the proposed travel path. In block 1418, a degree of potential impingement at the candidate positions is determined by referring to the list of potentially intersecting candidates, the dynamic exterior boundary 13 of the materials handling vehicle 10, and obstacle data represented in the environmental layout data. In block 1420, the proposed travel path is modified to mitigate the degree of potential impingement. In block 1422, the drive unit D, steering unit S, localization module L, and navigation module N cooperate to direct and navigate the materials handling vehicle 10 along the modified proposed travel path. The method may further include navigating the materials handling vehicle 10 along the modified proposed travel path through cooperation of the drive unit, steering unit, localization module, and navigation module.

In embodiments, and as described in greater detail below with respect to FIGS. 15-18, after receiving errors and modifying a proposed travel path to address the errors through a path verification step, the path validation tool may further comprise a path optimization tool that dynamically alters, optimizes, and reduces errors with respect to a materials handling vehicle's navigated travel path. For example, the proposed travel path may be set as the nominal travel path that a materials handling vehicle navigates. The path optimization tool is configured to dynamically modify a nominal travel path during navigation of the materials handling vehicle based on path segment error reduction. As the materials handling vehicle navigates along the nominal travel path, the path optimization tool may modify the nominal travel path based on detection of an obstacle. The materials handling vehicle may then be directed onto a translated, modified travel path merging from and to the nominal path to avoid the obstacle.

Figure 15:
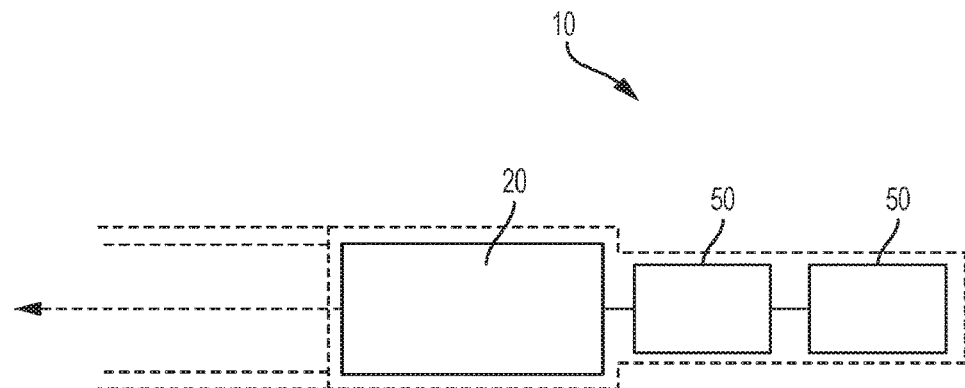
FIG. 15 depicts a materials handling vehicle including a dynamic vehicle boundary around a tugger and a plurality of trailers and disposed on a path according to one or more embodiments shown and described herein.
Figure 16:
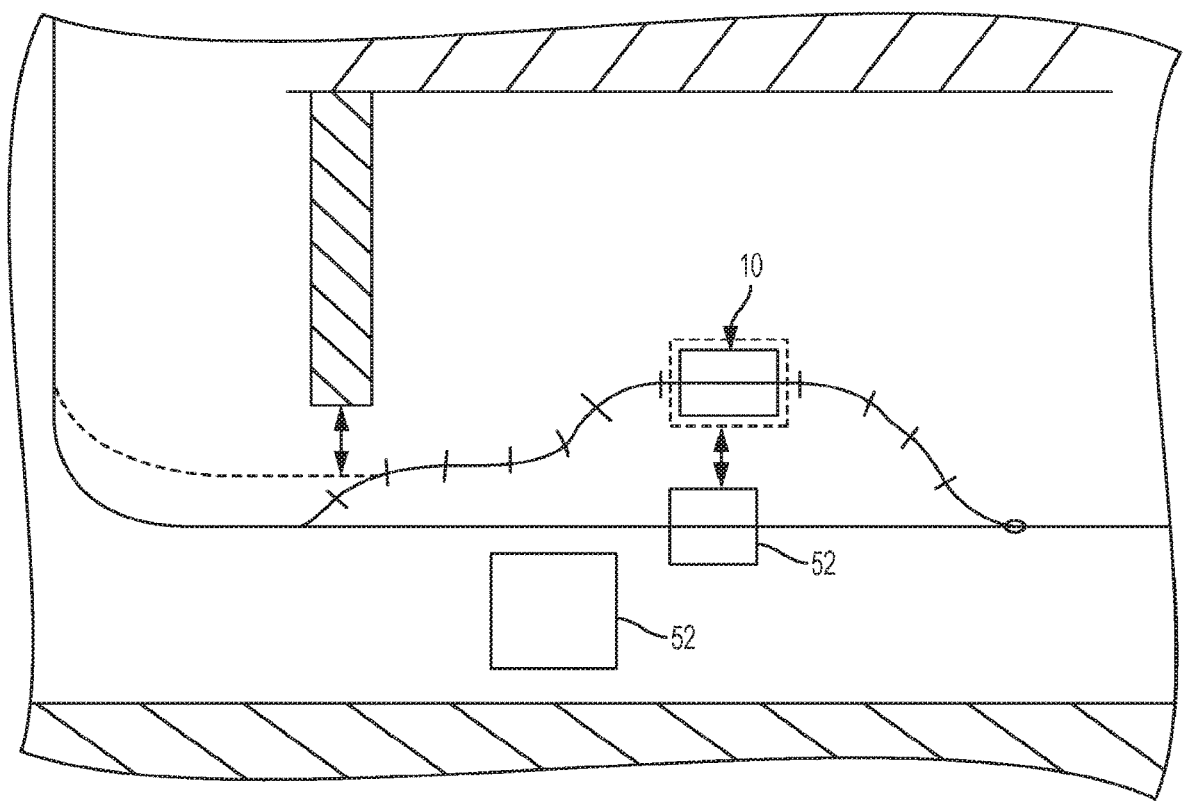
FIG. 16 depicts a materials handling vehicle on a dynamically translated path from a nominal path according to one or more embodiments shown and described herein.

Referring now to FIGS. 15 and 16, it is contemplated that a materials handling vehicle (i.e., a tow vehicle and any number of trailers), traveling in autonomous mode, should maintain a clearance distance from all obstacles, not trigger laser fields on known obstacles, and not cause tow trailers to collide with one another or with known obstacles. The materials handling vehicle will be given a nominal path as illustrated in FIG. 16 for travel in autonomous mode. Obstacles (such as one of obstacle(s) 52 in FIG. 16) may be identified and added to an obstacle map while the materials handling vehicle follows the nominal path. The obstacle map may also contain fixed infrastructure. In one embodiment, the obstacle map is regularly updated by laser scans from the laser scanner of the materials handling vehicle. In one embodiment, the obstacle map is on a network and is updated by the laser scans of not only the materials handling vehicle, but other materials handling vehicles operating in the warehouse. The nominal path may need to be altered dynamically such that the tugger and trailers autonomously continue around any identified obstacles, while following the requirements described earlier in this section. Any obstacle that is not detected in subsequent scans of that area will be removed from the map, as would happen when an obstacle has moved, potentially allowing the nominal path to continue through that space without alteration.

Where obstacles in the obstacle map will impinge on the movement area and/or the clearance area or clearance field geometry of the materials handling vehicle, a modified path will be created based on translating the obstructed section of the nominal path to avoid the obstacle, as shown in FIG. 16. If this is not possible, due to other obstacles or infrastructure being in the way, then the path optimization tool will try to again however for the second try, the path optimization tool will not consider the clearance area and will attempt to operate the materials handling vehicle as if driving in a hazard zone. A hazard zone is a marked area of the warehouse where the autonomous vehicle speed is restricted. If a translated path is still not created, then the materials handling vehicle will halt and wait for manual intervention.

In embodiments, for example, after modifying the proposed travel path in block 1316 of FIG. 13, the path validation tool P may dynamically modify the proposed travel path to establish a dynamically modified travel path. The path validation tool P executes path validation logic to determine vehicle pose along the modified proposed travel path as the drive unit, steering unit, localization module, and navigation module cooperate to direct the materials handling vehicle 10 along the modified proposed travel path, and determine whether the dynamic vehicle boundary of the materials handling vehicle 10 is likely to intersect obstacles represented in the environmental layout data based on the determined vehicle pose at candidate positions along the modified proposed travel path. The path validation tool further executes path validation logic to determine a degree of potential impingement at the candidate positions by referring to the dynamic vehicle boundary of the materials handling vehicle 10 and obstacle data represented in the environmental layout data, dynamically modify the modified proposed travel path to mitigate the degree of potential impingement and establish a dynamically modified travel path configured to merge from and to the modified proposed travel path, and navigate the materials handling vehicle 10 along the dynamically modified travel path.

If there is a potential translation required to avoid an obstacle, then a modified path (as illustrated in FIG. 16) will be created by combining merging paths from the nominal path (or current materials handling vehicle location) to the translated path section, then another merging path back from the translated path section to the nominal path. Both the 'from' and the 'to' merges are obtained by fitting a joining path, for example a joining path could consist of a series of three clothoids. The merge path lengths are varied until a close fit is found. For the triple clothoid joining case, the fitter works by optimizing towards the lowest join error starting with a 1:1:1 length ratio for the ratios of clothoid lengths, the total length, and the curvature at the end of the first clothoid. The initial total length is the Euclidean distance between the join points and curvature options are an even spread between the maximum allowed positive and maximum negative path curvature (essentially steer angle limits). Thus, in embodiments, establishment of the dynamically modified travel path configured to merge from and to the modified proposed travel path may include fitting a joining path to the modified proposed travel path, the joining path comprising a series of three clothoids and merge path lengths, the merge path lengths configured to be varied until a close fit comprising a lowest join error is determined. Optimization towards the lowest join error may include an initial proposed merge path starting at a 1:1:1 length ratio with respect to the ratios of clothoid lengths, the total length of the initial proposed merge path, and a curvature at an end of a first clothoid. The total length of the proposed merge path may include a Euclidean distance between a pair of join points, and curvature options with respect to the curvature may include an even spread between a maximum allowed positive curvature and a maximum negative path curvature. The even spread may be based on one or more steer angle limits.

This replanning may occur as often as necessary. For example, as the materials handling vehicle drives around an obstacle and reveals additional obstacles that are added to the obstacle map, the existing modified path may become obstructed and so be replanned. The vehicle may be configured to only generate a modified path that is observed to be free of obstacles all the way to the return to the original path. The vehicle may also be configured to generate a modified path where the return to the original path is not fully observed, in which case the vehicle may generate further modified path(s) to avoid subsequently revealed obstacles as it progresses along the modified path. If there is ever no valid modified path back on to the nominal path, based on the current obstacle map data, then the materials handling vehicle will halt and await manual intervention.

In one embodiment, a path verification step as applied by the path validation tool will return errors in the nominal path and the location along the nominal path where each error occurs. The path optimization tool will attempt to reduce each error as much as possible by gradually adjusting the nominal path leading up to the distance at which the error occurs. Adjustments include changing the length of each path segment and adding path segments. The path segments may be smoothly joined, with a maximum allowed curvature and being within allowable sharpness limits. The path optimization tool will identify any location where the lowest error causes a pinch point. Nearby pinch points may be combined into a single zone. These pinch points are highlighted for a user to see and acknowledge, except for those pinch points that are within an existing hazard zone on the warehouse map.

If the nominal path is derived from a user manually driving the materials handling vehicle in a warehouse, the resulting manual path may appear as a series of shallow arcs and clothoids. The path optimization tool will smooth these series of shallow arcs and clothoids such that the final nominal path comprises a straight segment where straight line paths are desired and smooth, continuous curves where turns are desired.

In this embodiment, the path optimization tool will provide an output comprising an error vector, type, and distance at which the error occurs. If the error is a collision type (i.e., intersection between the dynamic boundary and an obstacle), then a translated path will be found that avoids the obstacle, or the tool will return an optimization failure if such a translated path cannot be found. If the error is a pinch type (i.e., intersection between the dynamic clearance area and an obstacle), then a translated path will be found, or the tool will record a pinch point at the point of the error along the nominal path if such a translated path cannot be found.

The path optimization tool will recursively apply corrections or alternative translated paths until a valid translated path is found. The path optimization tool will try to enforce convergence by allowing changes in the path divergence (distance between the translated path and the nominal path along the travel direction) up to a maximum path divergence threshold. The path optimization tool will also use a maximum iteration threshold for pinch point avoidance planning as it may be impossible to avoid pinch points in tight locations.

At the first path distance at which an intersection with an obstacle occurs, the path optimization tool will determine if the current pose of the materials handling vehicle can be moved away from the obstacle to avoid the intersection without causing additional intersections with the same or other obstacles. If possible, create the translated path and smooth the translated path. The path optimization tool will smooth the translated path by identifying the minimal amount of change in the translated path to achieve a desired final pose. Generally this will be lengthening or shortening the path segments of the translated path or changing the sharpness (change in curvature of the translated path). In some embodiments, it may be necessary to add segments to the translated path to smooth it. The path smoothing will attempt to leave the nominal path earlier then rejoin the nominal path farther on, so as not to alter the nominal path with the translated path. The path optimization tool will attempt to verify the translated path again and check whether the intersection distance is before or after the last one. If it is before, then the path optimization tool will recursively correct the translated path. The path optimization tool will use a recursive correction threshold to halt the created translated path because it may not be possible to avoid pinching in some locations.

Along with the nominal path, a swept outline is used to identify the paths of the one or more trailers following the tow vehicle along the nominal path. The shape of the swept outline of the materials handling vehicle may change due to the additions of translated paths. Simply extending a straight segment of the nominal path with a translated path should not change the shape of the swept outline which makes translated paths easier to predict. Changing an arc length of a nominal path with a translated path may cause a discrepancy in the swept outline and changing a curvature of a nominal path with a translated path may cause a larger discrepancy. If the discrepancies vary too greatly between path adjustments then smaller adjustments would be necessary to allow convergence.

Figure 17:
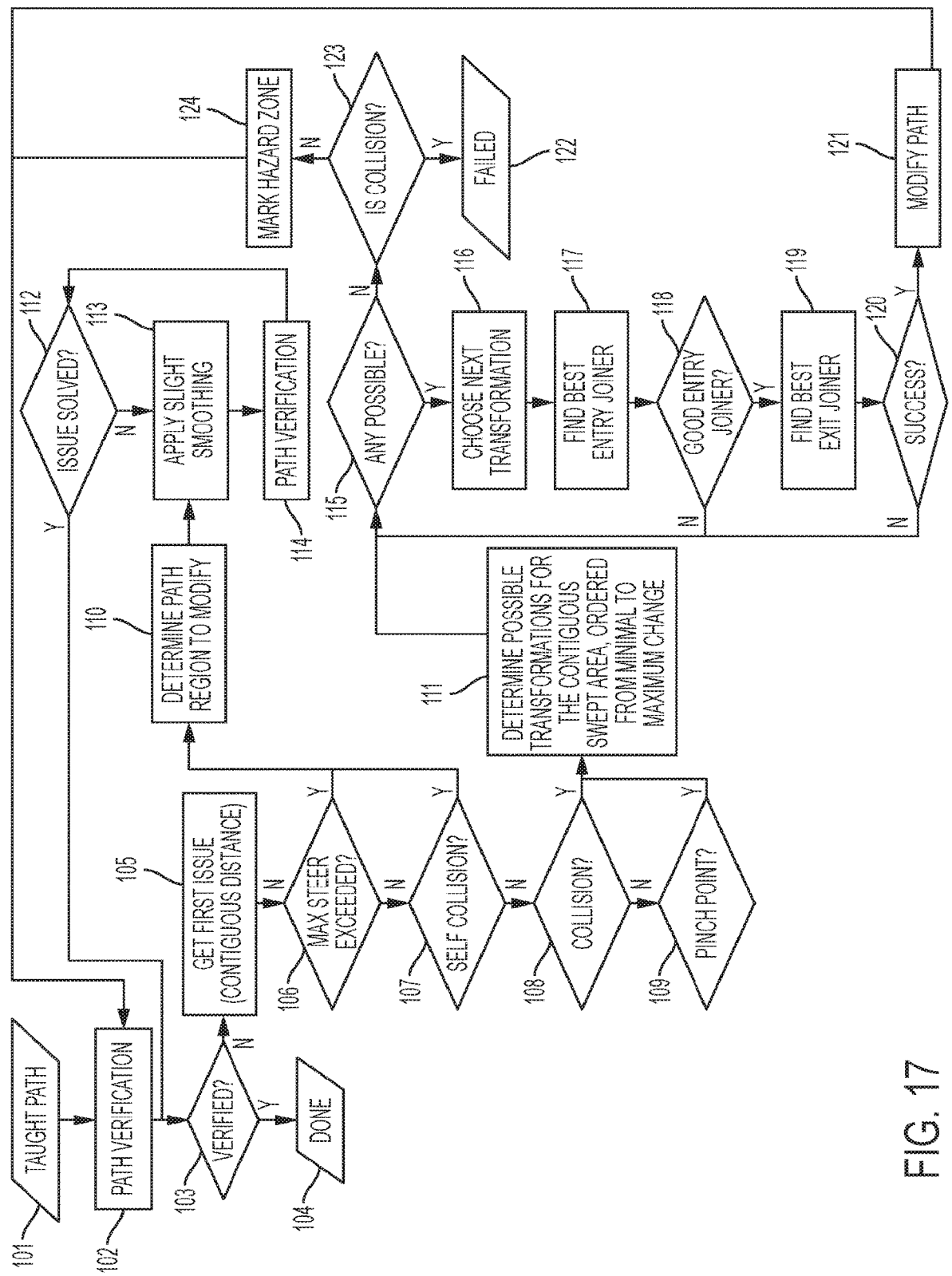
FIG. 17 depicts a process for path optimization of a materials handling vehicle according to one or more embodiments shown and described herein.

In another embodiment, and referring to FIG. 17, the path verification step, as illustrates through blocks 101-104 of FIG. 17, will return errors in the nominal path (i.e., locations where the nominal path intersects with known obstacles) and the location along the nominal path where the error occurs. The path optimization tool will locate contiguous segments (i.e. a section of path from a start to an end distance) in block 105 that have an error of the same type. The path optimization tool will select the first occurring error regardless of type however, if there are multiple errors along the nominal path, the path optimization tool will prioritize them in order of: maximum steer exceeded in block 106; self collision (i.e., between trailers and/or between trailers and the tow vehicle) in block 107; intersection with an obstacle indicating collision in block 108; and lastly any pinch point errors in block 109. The cases of maximum steer-exceeded and self-collision in blocks 106-107 are likely caused by too severe of a turn at an earlier point in the nominal path. In block 110, the offset of the affected trailer connection from the tow vehicle is used to shift the affected nominal path region backward. The severe part is gradually smoothed out in block 113 to have a smaller curvature. This is iterative, until the steer-exceeded or self-collision warning does not occur and the path is verified in block 114 and the issue is solved in block 112. For the collision and pinch point cases, the combined series of swept outlines will be transformed minimally in blocks 111-121 such that there are no collisions or pinch points. If pinch points cannot be avoided in block 115 then the path optimization tool will attempt to keep one side of the affected trailer not pinched and move on. If pinch points on both sides of the affected trailer cannot be avoided then keep the impingement distance on each side equidistant. For example, in block 124, a hazard zone in such a scenario may be marked. Collisions must be avoided, however, as determined in block 123, and failure to do so will result in block 122 in a "no path possible" result by the path optimization tool.

After any change is made to the nominal path, the translated paths needs to be merged into the nominal path and verified for operation of the materials handling vehicle. The path merges themselves could result in additional verification failures. Multiple translated paths for each error may be tried and a variety of merge distances will be attempted until a good merge between the translated path and nominal path is found. The exit merge will undergo the same treatment but it is acceptable that the exit merge has errors. A bad exit merge would result in subsequent path alterations. If an attempted change does not work, different transforms of the translated path will be attempted. A slight rotation of the translated path could be enough to pass the checks.

A contiguous distance refers to a range of distances along a path, from a start distance to an end distance, in which similar obstructions(s) occur in close proximity to one another.

To attempt the transformation, a path segment is separated from the path, creating a start path, a middle path, and an end path. The middle path is then transformed such that the obstacles are all avoided. From the transformation, there are two joins necessary; start to middle and middle to end. A join starts at a point before the end of the first path and ends at a point after the start of the second path. The distance replaced on the paths will vary depending on how much discontinuity has been introduced by the transformation. Variations of the transformation will be attempted until an unobstructed path is obtained.

A function may exist that joins two arbitrary poses in as direct a manner as possible without exceeding the maximum curvature limits or the maximum sharpness limits. The joiner is a series of three clothoids, though other types of joiner are possible. The path optimization tool may plan many valid joiners and choose the best one, which is defined as the first joiner planned that has error within the configurable join tolerance. Also, in one implementation, the first result is the shortest joiner due to joiner length being increased for each subsequent optimization step.

To identify the proper clothoids, we use the following data: curvature_start value, curvature_end value, angle-change value, maximum-curvature value, maximum-sharpness value, minimum-sharpness value, and an initial-length estimate. From that data, the length of each segment and the intermediate curvature(s) can be optimized to identify the best fit triple clothoid. The calculations are constrained such that the solution is found once the end pose (x, y, and θ) is brought within preconfigured tolerances of the target (e.g., one centimeter and one degree).

Once a joiner is found, the path verification step may be run by the path optimization tool to ensure that the original issue of an intersection with an object is fixed and no new issue was added. If there is still a problem, potentially altering the join distance may be all that is needed to solve the issue. It is contemplated that a larger join distance may result in a smoother transition. That is, the path optimization tool may start far back on the nominal path and work forward, but try to always end on the start of the translated path to ensure a consistent swept area. Thus, the path verification step may be run on the path each time it is modified by a candidate joiner. Further, the path distance at which the joiner starts or ends may be varied until a suitable or best joiner is found.

Figure 18:
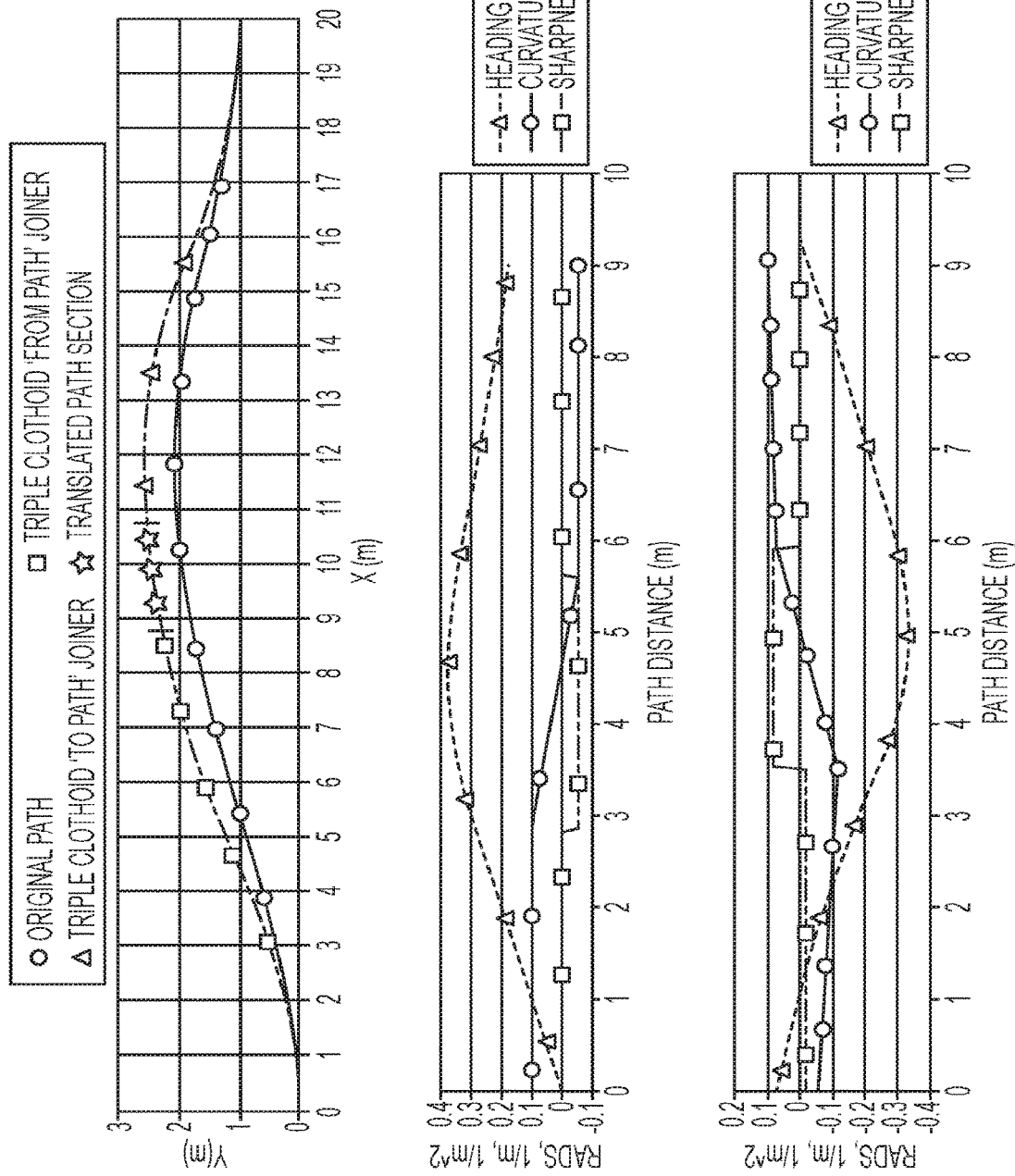
FIG. 18 graphically depicts results of changes made to a path to avoid an obstacle according to one or more embodiments shown and described herein.

FIG. 18 graphically depicts changes to and from the nominal path. The first graph shows a top down view where the nominal path has been modified. The translated path section has been moved slightly upwards and left of the nominal. The two joiners have been fitted to morph the nominal path smoothly to and from the translated path section. The following two graphs show the details of the three clothoids that make up each joiner. Note that the curvature is continuous, which allows the materials handling vehicle to follow the path smoothly and without needing to stop to change the steer angle.

The path optimization tool may be used on a computer to verify a nominal path in a warehouse and identify any problems with obstacles before an automated vehicle following the path is commissioned and operated, or on an automated vehicle to dynamically modify the nominal path to avoid new obstacles identified by the laser scanner. It is contemplated that the automated vehicle may hug an obstacle for a maximum length before rejoinder with the nominal path is required. For all pinch points identified, the path optimization tool may still allow an automated vehicle to operate, as the vehicle controller may operate the automated vehicle at a slower speed through the pinch zone with the pinch point.

The path optimization tool directly verifies the actual tow vehicle, trailer, and clearance field geometry will not collide with obstacles, rather than using approximations that could be suboptimal. The path optimization tool considers a train of trailers in addition to the tow vehicle, whereas other approaches have so far only considered the AGV itself. The use of clothoid joiners rather than splines, and clothoids are arguably smoother for a materials handling vehicle to follow than splines. The path optimization tool enforces a continuous path curvature, a maximum path curvature, and a maximum path sharpness to ensure that the translated path is physically able to be followed. The path optimization tool updates the obstacle map as new laser scan data is received and objects are identified, whereas some other approaches require full information up front. The path optimization tool may also consider trailer paths behind a tow vehicle during obstacle avoidance.

Certain terminology is used in the disclosure for convenience only and is not limiting. Words like "left," "right," "front," "back," "upper," "lower," etc., designate directions in the drawings to which reference is made. The terminology includes the words noted above as well as derivatives thereof and words of similar import.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. A materials handling vehicle comprising a vehicle body, materials handling hardware, one or more wheels, a drive unit, a steering unit, a localization module, a navigation module, and a path validation tool, wherein:
   the drive unit, steering unit, localization module, and navigation module cooperate to direct the materials handling vehicle along a travel path in a warehouse;
   the path validation tool comprises environmental layout data of the warehouse, a proposed travel path within the warehouse, kinematics of the materials handling vehicle, a dynamic exterior boundary of the materials handling vehicle, and a dynamic clearance boundary of the materials handling vehicle;
   the dynamic clearance boundary is enlarged relative to at least a portion of the dynamic exterior boundary of the materials handling vehicle to define an enlarged boundary about at least a portion of the materials handling vehicle;
   the path validation tool executes path validation logic to:
      (i) determine a vehicle pose along the proposed travel path,
      (ii(a)) determine whether the dynamic exterior boundary or the dynamic clearance boundary of the vehicle is likely to intersect obstacles represented in the environmental layout data, based on the determined vehicle pose and a degree of potential impingement at candidate positions along the proposed travel path, to respectively identify an obstacle collision error or a pinch point error,
      (ii(b)) identify the obstacle collision error as a collision intersection determined when the dynamic exterior boundary of the vehicle is likely to intersect obstacles represented in the environmental layout data;
      (ii(c)) identify the pinch point error as a pinch point intersection determined when the dynamic clearance boundary of the vehicle is likely to intersect obstacles represented in the environmental layout data;
      (iii) eliminate the obstacle collision error, the pinch point error, or both, by modification of the proposed travel path, wherein the obstacle collision error is prioritized for elimination over the pinch point error when both are identified,
      (iv) mitigate the obstacle collision error, the pinch point error, or both, to avoid a collision when the proposed travel path is not modifiable to eliminate the obstacle collision error, the pinch point error, or both, wherein the obstacle collision error is prioritized for mitigation over the pinch point error when both are identified; and the drive unit, steering unit, localization module, navigation module, and the path validation tool cooperate to direct the materials handling vehicle along the modified proposed travel path.

2. The materials handling vehicle of claim 1, further comprising one or more sensors configured to generate an active scan field, the one or more sensors comprising a camera, a 3D camera, a 2D laser scanner, a 3D laser scanner, radar array, ultrasonic array, or combinations thereof, wherein:
  the dynamic exterior boundary of the materials handling vehicle approximates a physical periphery of the materials handling vehicle and is defined at an offset distance from the physical periphery of the materials handling vehicle and contains the active scan field;
  the degree of potential impingement comprises an impingement distance that is an overlap distance at candidate positions indicative of an overlap between the dynamic exterior boundary or the dynamic clearance boundary of the materials handling vehicle and obstacle data; and
  the path validation tool executes path validation logic to
    (i) determine whether the dynamic exterior boundary of the vehicle is likely to intersect obstacles represented in the environmental layout data based on the determined vehicle pose and the degree of potential impingement at candidate positions along the proposed travel path to respectively identify the obstacle collision error within the active scan field, and
    (ii) stop the materials handling vehicle when the obstacles are determined to be likely to impinge the active scan field and the proposed travel path is not modifiable to eliminate the obstacle collision error to avoid the collision.

3. The materials handling vehicle of claim 1, wherein the path validation tool executes path logic to determine vehicle pose along one of the proposed travel path and the modified proposed travel path at pre-determined intervals.

4. The materials handling vehicle of claim 1, wherein the kinematics of the materials handling vehicle comprise a kinematic center C of the materials handling vehicle, exterior dimensions of the materials handling vehicle, a turning radius of the materials handling vehicle, and pose data of the materials handling vehicle.

5. The materials handling vehicle of claim 4, wherein the materials handling vehicle comprises a tugger and one or more trailers coupled to the tugger, and the pose data is indicative of pose data respectively of the tugger and the one or more trailers.

6. The materials handling vehicle of claim 1, wherein:
  the materials handling vehicle comprises a tugger and one or more trailers coupled to the tugger;
  the dynamic exterior boundary approximates a physical periphery of the tugger of the materials handling vehicle;
  a potentially intersecting obstacle is a trailer of the one or more trailers coupled to the tugger; and
  the obstacle collision error comprises a trailer self-collision error.

7. The materials handling vehicle of claim 1, wherein:
  the materials handling vehicle comprises a tugger and one or more trailers coupled to the tugger;
  the dynamic exterior boundary approximates a physical periphery of a trailer of the one or more trailers of the materials handling vehicle;
  a potentially intersecting obstacle is another trailer of the one or more trailers coupled to the trailer; and
  the obstacle collision error comprises a trailer self-collision error.

8. The materials handling vehicle of claim 1, wherein:
  the materials handling vehicle comprises a tugger and one or more trailers coupled to the tugger;
  the dynamic exterior boundary approximates a physical periphery of one of the tugger and the one or more trailers of the materials handling vehicle; and
  a potentially intersecting obstacle is an obstacle represented in the environmental layout data separate from the materials handling vehicle.

9. The materials handling vehicle of claim 1, wherein the path validation tool executes path validation logic to:
  (i) determine vehicle pose along the modified proposed travel path as the drive unit, steering unit, localization module, and navigation module cooperate to direct the materials handling vehicle along the modified proposed travel path;
  (ii) dynamically modify the modified proposed travel path to mitigate the degree of potential impingement and establish a dynamically modified travel path configured to merge from and to the modified proposed travel path; and
  (iii) navigate the materials handling vehicle along the dynamically modified travel path.

10. The materials handling vehicle of claim 9, wherein the dynamically modified travel path is established by, at least, fitting a joining path to the modified proposed travel path, the joining path comprising a series of three clothoids and merge path lengths, the merge path lengths configured to be varied until a close fit comprising a lowest join error is determined.

11. The materials handling vehicle of claim 10, wherein the total length of the initial proposed merge path comprises a Euclidean distance between a pair of join points.

12. The materials handling vehicle of claim 10, wherein a curvature at the end of the first clothoid comprises a curvature selected from a curvature spread between a maximum allowed positive curvature and a maximum negative path curvature, based on one or more steer angle limits.

13. The materials handling vehicle of claim 1, wherein the path validation tool executes path validation logic to:
  (i) identify a maximum steer exceeded error, a self-collision error when a potentially intersecting obstacle is a part of the materials handling vehicle, or combinations thereof; and
  (ii) prioritize error elimination or mitigation in order of the maximum steer exceeded error, the self-collision error, the obstacle collision error, and the pinch point error.

14. The materials handling vehicle of claim 13, wherein the path validation tool executes path validation logic to modify the proposed travel path by smoothing the proposed travel path iteratively until the identified error is eliminated when the maximum steer exceeded error, the self-collision error, or combinations thereof, is identified.

15. The materials handling vehicle of claim 1, wherein the path validation tool executes path validation logic to:
  (i) eliminate the obstacle collision error, the pinch point error, or both, on both sides of the materials handling vehicle when possible by modification of the proposed travel path; and
  (ii) mitigate the obstacle collision error, the pinch point error, or both, by eliminating the obstacle collision error, the pinch point error, or both, on at least one side of the vehicle when the proposed travel path is not modifiable to eliminate the obstacle collision error, the pinch point error, or both, on both sides of the vehicle.

16. The materials handling vehicle of claim 15, wherein the path validation tool executes path validation logic to:
(i) set an impingement distance on each side equidistant and mark an area of the proposed travel path including the obstacle collision error, the pinch point error, or both, as a hazard area, when the proposed travel path is not modifiable to mitigate the obstacle collision error, the pinch point error, or both, by eliminating the obstacle collision error, the pinch point error, or both, on at least one side of the vehicle, though a collision is avoidable, wherein the degree of potential impingement comprises the impingement distance that is an overlap distance at candidate positions indicative of an overlap between the dynamic exterior boundary or the dynamic clearance boundary of the materials handling vehicle and obstacle data; and
(ii) automatically stop the materials handling vehicle to avoid the collision when the proposed travel path is not modifiable to mitigate the obstacle collision error, the pinch point error, or both, by eliminating the obstacle collision error, the pinch point error, or both, on at least one side of the vehicle, and a collision is unavoidable.

17. A method of executing path validation logic with respect to a materials handling vehicle comprising a vehicle body, materials handling hardware, one or more wheels, a drive unit, a steering unit, a localization module, a navigation module, and a path validation tool, the drive unit, steering unit, localization module, and navigation module cooperate to direct the materials handling vehicle along a travel path in a warehouse, the method comprising:
receiving a plurality of inputs into the path validation tool, the plurality of inputs comprising environmental layout data of the warehouse, a proposed travel path within the warehouse, kinematics of the materials handling vehicle, a dynamic exterior boundary of the materials handling vehicle, and a dynamic clearance boundary of the materials handling vehicle that is enlarged relative to at least a portion of the dynamic exterior boundary of the materials handling vehicle to define an enlarged boundary about at least a portion of the materials handling vehicle;
determining a vehicle pose along the proposed travel path through the path validation tool;
determining whether the dynamic exterior boundary or the dynamic clearance boundary of the vehicle is likely to intersect obstacles represented in the environmental layout data based on the determined vehicle pose and a degree of potential impingement at candidate positions along the proposed travel path to respectively identify an obstacle collision error or a pinch point error;
identifying the obstacle collision error as a collision intersection determined when the dynamic exterior boundary of the vehicle is likely to intersect obstacles represented in the environmental layout data;
identifying the pinch point error as a pinch point intersection determined when the dynamic clearance boundary of the vehicle is likely to intersect obstacles represented in the environmental layout data
eliminating the obstacle collision error, the pinch point error, or both, by modification of the proposed travel path, wherein when the obstacle collision error and the pinch point error are identified, the obstacle collision error is prioritized for elimination over the pinch point error when both are identified;
mitigating the obstacle collision error, the pinch point error, or both, to avoid a collision when the proposed travel path is not modifiable to eliminate the obstacle collision error, the pinch point error, or both, by modification of the proposed travel path through the path validation tool, wherein when the obstacle collision error and the pinch point error are identified, the obstacle collision error is prioritized for elimination over the pinch point error when both are identified; and
navigating the materials handling vehicle along the modified proposed travel path through cooperation of the drive unit, steering unit, localization module, navigation module, and the path validation tool.

18. The method of claim 17, further comprising:
identifying a maximum steer exceeded error, a self-collision error when a potentially intersecting obstacle is a part of the materials handling vehicle, or combinations thereof; and
prioritizing error elimination or mitigation in order of the maximum steer exceeded error, the self-collision error, the obstacle collision error, and the pinch point error.

19. The method of claim 18, further comprising modifying the proposed travel path by smoothing the proposed travel path iteratively until the identified error is eliminated when the maximum steer exceeded error, the self-collision error, or combinations thereof, is identified.

20. The method of claim 17, further comprising:
eliminating the obstacle collision error, the pinch point error, or both, on both sides of the materials handling vehicle when possible when possible by modification of the proposed travel path;
mitigating the obstacle collision error, the pinch point error, or both, by eliminating the obstacle collision error, the pinch point error, or both, on at least one side of the vehicle when the proposed travel path is not modifiable to eliminate the obstacle collision error, the pinch point error, or both, on both sides of the vehicle;
setting an impingement distance on each side equidistant and mark an area of the proposed travel path including the obstacle collision error, the pinch point error, or both, as a hazard area, when the proposed travel path is not modifiable to mitigate the obstacle collision error, the pinch point error, or both, by eliminating the obstacle collision error, the pinch point error, or both, on at least one side of the vehicle, though a collision is avoidable, wherein the degree of potential impingement comprises the impingement distance that is an overlap distance at candidate positions indicative of an overlap between the dynamic exterior boundary or the dynamic clearance boundary of the materials handling vehicle and obstacle data; and
automatically stopping the materials handling vehicle to avoid the collision when the proposed travel path is not modifiable to mitigate the obstacle collision error, the pinch point error, or both, by eliminating the obstacle collision error, the pinch point error, or both, on at least one side of the vehicle, and a collision is unavoidable.

* * * * *